United States Patent [19]

Miyake et al.

[11] Patent Number: 5,740,092
[45] Date of Patent: Apr. 14, 1998

[54] SIGNAL PROCESSOR

[75] Inventors: Jiro Miyake; Tamotsu Nishiyama; Katsuya Hasegawa; Kazuki Ninomiya, all of Osaka, Japan

[73] Assignee: Matsushita Electric Industrial Co., Ltd., Osaka, Japan

[21] Appl. No.: 299,598

[22] Filed: Sep. 1, 1994

[30] Foreign Application Priority Data

Sep. 2, 1993 [JP] Japan ............... 5-218553
Dec. 14, 1993 [JP] Japan ............... 5-312933

[51] Int. Cl.⁶ ............... G06F 7/38; H04N 9/64
[52] U.S. Cl. ............... 364/736.06; 364/736.04; 348/555; 348/720; 348/721
[58] Field of Search ............... 364/736, 750.5, 364/736.06, 736.04; 348/554, 555, 556, 719, 720, 721

[56] References Cited

U.S. PATENT DOCUMENTS

| | | | |
|---|---|---|---|
| 4,712,175 | 12/1987 | Torii et al. | 395/800 |
| 4,736,333 | 4/1988 | Mead et al. | 364/736 |
| 4,807,183 | 2/1989 | Kung et al. | 395/312 |
| 4,887,211 | 12/1989 | Theil et al. | 364/413.13 |
| 5,055,997 | 10/1991 | Sluijter et al. | 395/312 |
| 5,191,547 | 3/1993 | Kawamoto et al. | 364/724.1 |
| 5,260,897 | 11/1993 | Toriumi et al. | 364/736 |
| 5,264,931 | 11/1993 | Yamada | 348/720 |
| 5,278,781 | 1/1994 | Aono et al. | 364/736 |
| 5,357,152 | 10/1994 | Jennings, III et al. | 326/39 |
| 5,475,442 | 12/1995 | Matsushita et al. | 348/554 |

FOREIGN PATENT DOCUMENTS 0 325 310  7/1989  European Pat. Off. .

OTHER PUBLICATIONS

G.M. Jacobs et al., "A Fully Asynchronous Digital Signal Processor Using Self-Timed Circuits", IEEE Journal of Solid-State Circuits, vol. 25, No. 6, Dec. 1990, pp. 1526–1536.

P.V.R. Raja et al., "An SIMD Multiple DSP Microprocessor System for Image Processing", Microprocessors and Microsystems, Nov. 1991, vol. 15, No. 9, Nov. 1991, pp. 493–501.

S-M. Park et al., "A Novel VLSI Architecture for the Read-Time Implementation of 2-D Signal Processing Systems", IEEE, 1988, pp. 582–585.

Joanblanq, et al., "A 54-MHz CMOS Programmable Video Signal Processor for HDTV Applications", Jun. 1990, IEE Journal of Solid-State Circuits, vol. 25, pp. 730–734.

Primary Examiner—Reba I. Elmore
Assistant Examiner—Robert J. Dolan
Attorney, Agent, or Firm—McDermott, Will & Emery

[57] ABSTRACT

In order to establish connections of plural arithmetic units capable of performing basic functions such as filtering in various connection ways, a bus switch is provided which has a plurality of input data lines connected with output terminals of the arithmetic units, at least one external input data line, a plurality of output data lines connected with input terminals of the arithmetic units, and at least one external output data line. In addition, two register sets are provided which hold arithmetic control information designating contents of processes to be performed by the arithmetic units and connection control information designating connection ways within the bus switch. Depending on the broadcasting system, information held by one of the register sets and information held by the other are updated, and, according to a process algorithm, either one of the two register sets is selected. As a result of such arrangement, a single piece of image processing hardware can be shared between different broadcasting systems as well as between different algorithms.

3 Claims, 25 Drawing Sheets

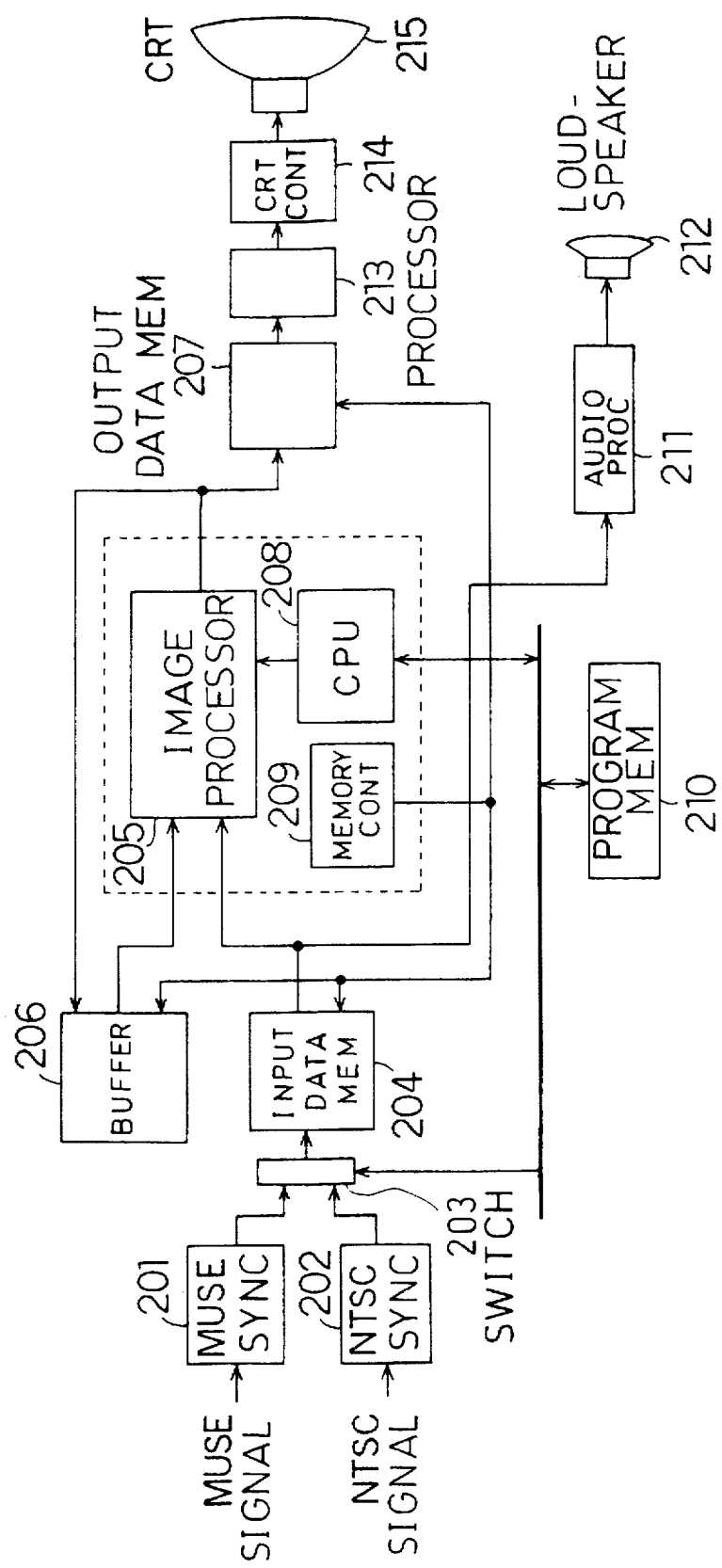
F I G. 1

131, 132 LINE MEMORY
105~107 ADD/INTPL 131, 132 LINE MEMORY
105~107 ADD/INTPL

F I G. 12
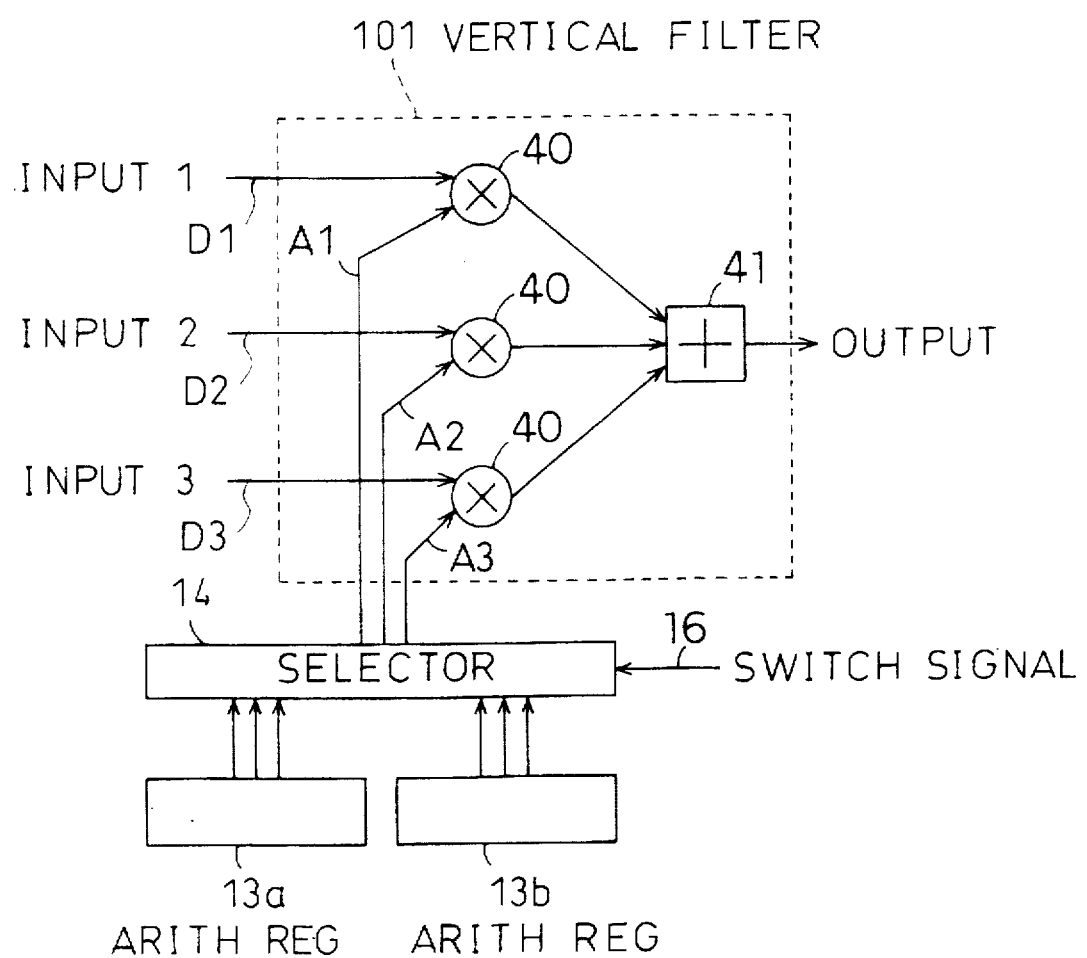

F I G. 15
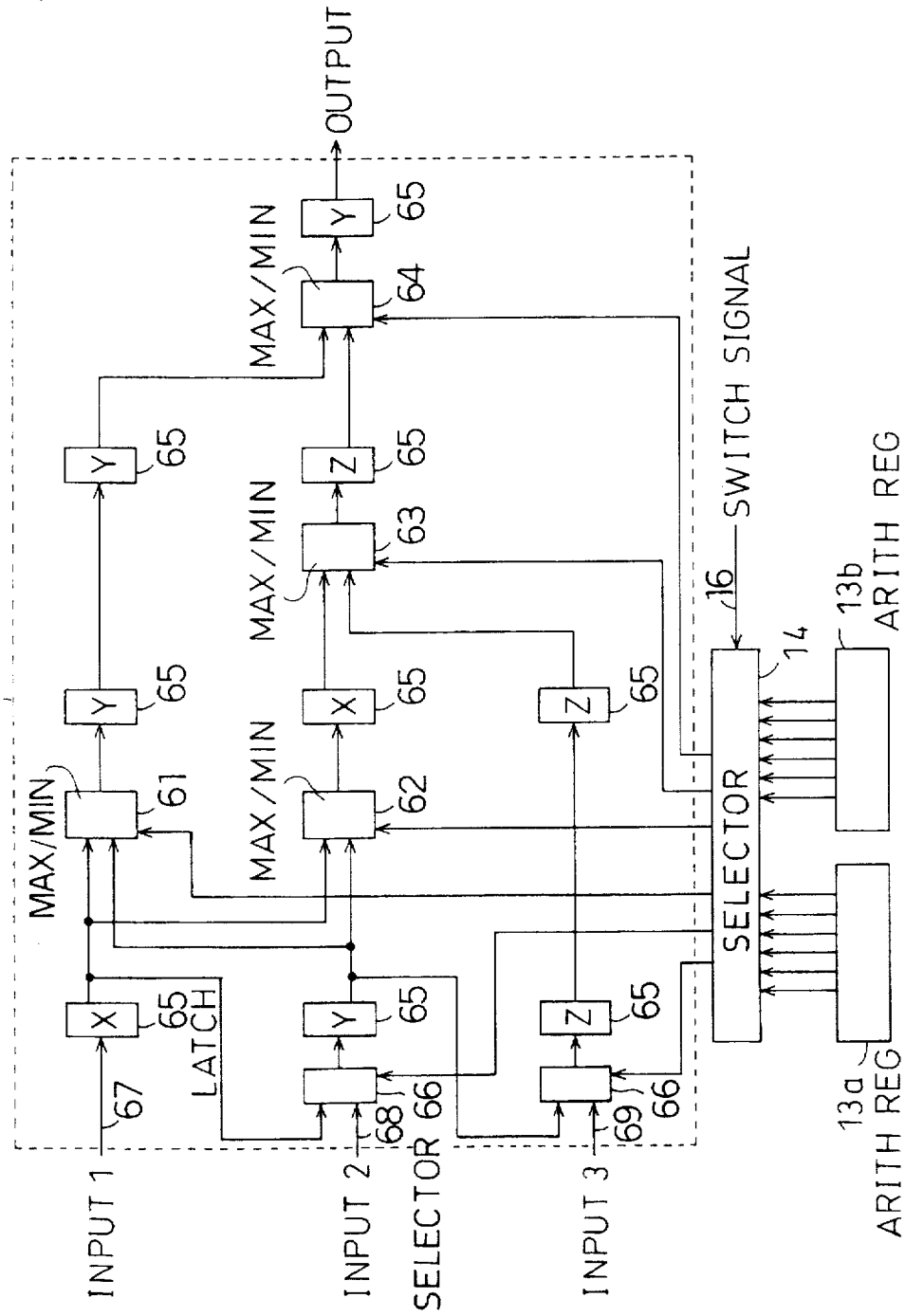

1

SIGNAL PROCESSOR

BACKGROUND OF THE INVENTION

This invention relates to a signal processor for the television receiver and the like apparatus.

Recently, there has been high demand for television systems having the capability of providing improved picture quality. To meet this demand, various television systems have been proposed, of which a television system called EDTV (Extended Definition Television) has been put to practical use. MUSE (Multiple sub-Nyquist Sampling Encoding), which is one of the sampling and encoding systems for the HDTV (High Definition Television) system, has been proposed and partly put to practical use. It is expected that advanced television systems, including EDTV II (i.e., the second-generation EDTV) and digital TV, will come in practice in the near future. This requires video signal processors such as TV receivers and video tape recorders (VTR) to function to receive and reproduce signals transmitted by different television systems including the NTSC (National Television System Committee) system. Additionally, special hardware that can deal with a plurality of digital filter arithmetic operations is also required.

Referring to FIG. 25, a conventional TV receiver is illustrated. TV receiver 401 receives both MUSE-system TV signals and EDTV-system TV signals. 403 is a piece of hardware that is dedicated to implement an algorithm for the MUSE-system processing, and 404 is a piece of hardware that is dedicated to implement an algorithm for the EDTV-system processing. Selector 405 performs a selection between an image signal that is decoded by MUSE hardware 403 and an image signal that is decoded by EDTV hardware 404 for displaying the selected signal on display unit 402. As described above, this conventional TV receiver 401 contains plural pieces of dedicated hardware to be compatible with different TV systems, and hardware switching from one TV system to another must be made depending on the received TV signal. This results in increasing the cost of TV receivers. Further, to be compatible with TV signals by forthcoming television systems and to deal with process algorithm modifications, new hardware must be developed which is time-consuming and expensive. Other signal processors for image processing, image identification, image compression, and audio processing which are required to perform a process switch also suffer the same problem described above.

C. Joanblanq et al discuss a programmable digital signal processor in a paper entitled "A 54-MHz CMOS Programmable Video Signal Processor for HDTV Applications," IEEE Journal of Solid-State Circuits, Vol. 25, No. 3, pp. 730–734, June 1990. This paper shows a sum-of-products arithmetic circuit to perform filter operations which is arranged within one chip. For example, in the 3-tap horizontal filter operation by this signal processor, three multipliers and three adders are used to perform a sum-of-products arithmetic operation of $a1 \times di + a2 \times d(i+1) + a3 \times d(i+2)$ where a1, a2, and a3 are factors and di is the i-th input data (i.e., the pixel data). This signal processor, however, has the problem in that the amount of hardware required for sum-of-products operations increases. Especially, the multiplier requires a larger amount of hardware, so that the provision of a great number of multipliers on one chip increases the chip area, the number of transistors, and the power consumption.

SUMMARY OF THE INVENTION

Bearing in mind the above-described problems, the present invention was made. It is therefore an object of the present invention to provide common hardware that can be shared among plural processing systems as well as among plural signal processing algorithms.

It is another object of the present invention to provide a technique for reducing the amount of hardware required for the sum-of-products operation so as to implement a digital filter made up of a less amount of hardware.

The present invention discloses a first signal processor. This signal processor employs a structure wherein, in order that connections of K arithmetic units where the number K is an integer greater than or equal to 2 are changed with broad flexibility, a switch means having at least (K+1) input data lines and having at least (K+1) output data lines is connected with the K arithmetic units. One of the (K+1) input data lines of the switch means receives external input data, and the remaining K input data lines receive outputs of the K arithmetic units. Obtained from one of the (K+1) output data lines of the switch means is output data to the outside, and data on the remaining K output data lines are used as input to the K arithmetic units. The switch means establishes the detachable and interchangeable connections of the (K+1) input data lines with the (K+1) output data lines by performing internal connection switching operations. Additionally, an information hold means is provided which holds arithmetic control information to designate contents of arithmetic operations performed by the K arithmetic units and holds connection control information to designate connection ways of the input data lines with the output data lines of the switch means.

The process of the first signal processor is switched by updating the arithmetic control information and the connection control information stored in the information hold means. Alternatively, if the information hold means is formed by a plurality of register sets capable of holding arithmetic control information and connection control information, this also permits the process of the first signal processor to switch by selecting one of the register sets. In both of these two signal processor process switch techniques, it is possible to accomplish, in various ways, the connection of the K arithmetic units having basic functions such as a filter function, through connection switch operations within the switch means on the basis of the connection control information. More specifically, the number of arithmetic units, the combination of arithmetic units, and the connection order of arithmetic units can be changed. As a result, it becomes possible to realize various signal processors with flexibility to different processing systems and algorithms using a single piece of hardware. Additionally, it is possible to change the contents of a process performed by the arithmetic unit on the basis of the arithmetic control information. More specifically, factors to be used by arithmetic units for sum-of-products operations and arithmetic unit internal connections can be changed.

The present invention discloses a second signal processor wherein data which is an intermediate result is held and at the same time a single multiplier and a single adder are repeatedly operated to find a final sum-of-products operation result. Input to the multiplier is switched by a shift operation of a shift register or by a select operation of a selector. For example, when performing an operation of $a1 \times di + a2 \times d(i+1) + a3 \times d(i+2)$, a first multiplier takes care of the first term operation (i.e. $a1 \times di$). Then, the product found by the first multiplier is added to a result of the second term operation found by a second multiplier (i.e., $a2 \times d(i+1)$). Finally, the sum thus found is added to a result of the third term operation found again by the second multiplier (i.e., $a3 \times d(i+2)$). Alternatively, zero is added to the first term operation result, and the sum found is added to the second term operation result, and the sum thus found is added to the third term operation result. In the latter case, the number of multipliers can be reduced down to one.

BRIEF DESCRIPTION OF THE DRAWINGS

FIG. 1 is a block diagram depicting a TV receiver incorporating therein a signal processor of a first embodiment of the present invention.

FIG. 12 is a block diagram showing the internal structure of a vertical filter which is an arithmetic unit shown in FIGS. 9–11 and also showing a control circuit thereof.

FIG. 15 is a block diagram showing the internal structure of a magnitude comparator which is a further arithmetic unit shown in FIGS. 9–11 and also showing a control circuit thereof.

DETAILED DESCRIPTION OF THE INVENTION

Figure 2:
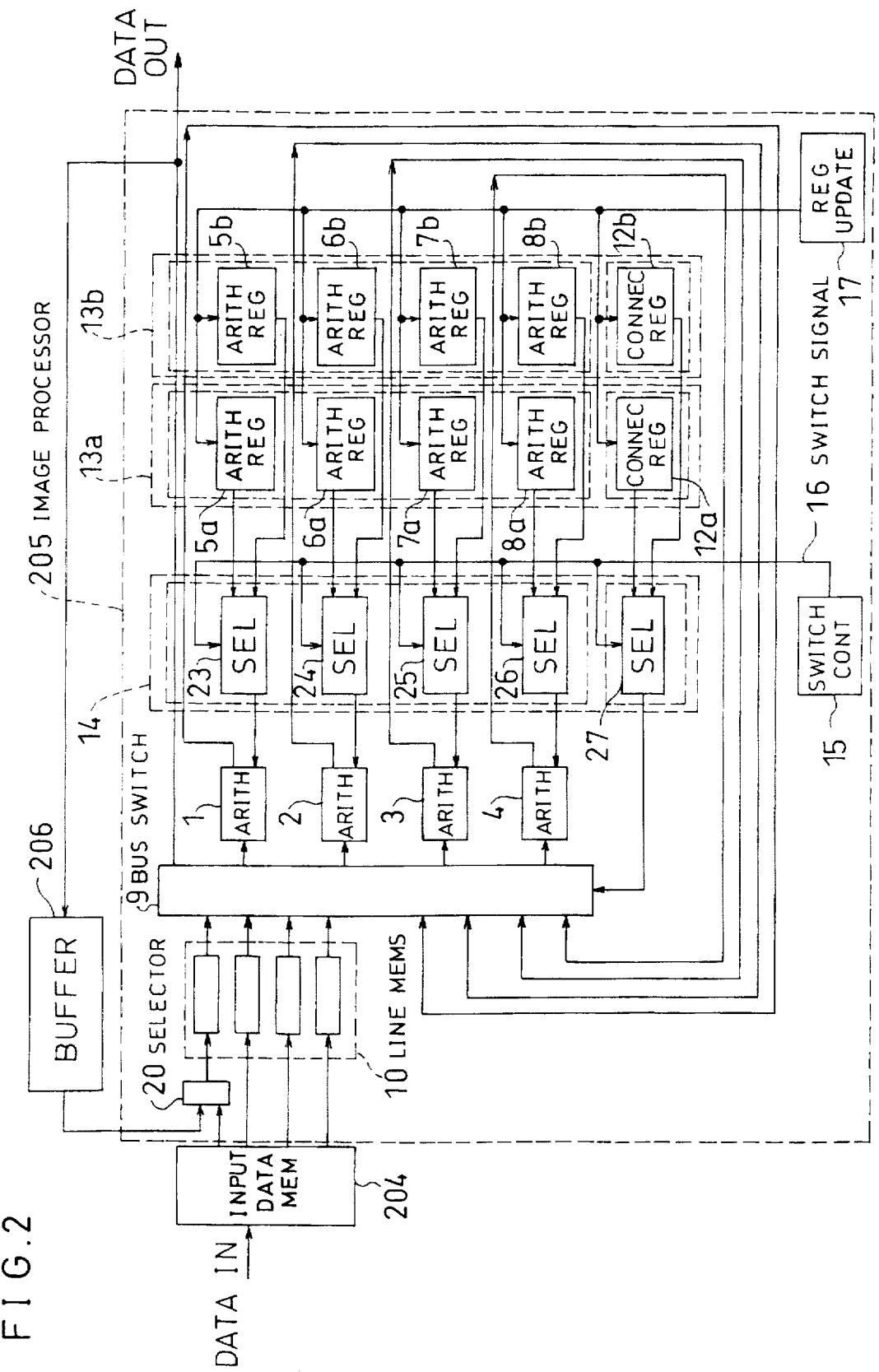
FIG. 2 is a block diagram depicting the internal structure of an image processor as shown in FIG. 1.

Referring to the accompanying drawings, some examples (i.e., signal processors) according to preferred embodiments of the present invention are described below.

EXAMPLE 1

Referring first to FIG. 1, the organization of a TV receiver incorporating a signal processor according to a first embodiment of the present invention is explained.

FIG. 1 shows MUSE synchronous circuit 201 and NTSC synchronous circuit 202. Upon receipt of a MUSE signal, MUSE sync circuit 201 detects a sync signal in the received MUSE signal and performs an A/D conversion operation on the received MUSE signal. MUSE sync circuit 201 then outputs a MUSE sync signal and digitized MUSE data. On the other hand, NTSC sync circuit 202 receives an NTSC signal different in the signal format from the MUSE signal, detects a sync signal in the received NTSC signal, and performs an A/D conversion operation on the received NTSC signal. NTSC sync circuit 202 then outputs an NTSC sync signal and digitized NTSC data. MUSE sync circuit 201 and NTSC sync circuit 202 each have the ability of performing non-linear processing operations for improved image quality. More specifically, MUSE sync circuit 201 has a waveform equalizer or de-emphasis filter, and NTSC sync circuit 202 has a ghost canceler.

Further shown in FIG. 1 are switch unit 203 and input data memory 204 made up of field memories. Switch unit 203 makes a selection between MUSE synch circuit's 201 output data and NTSC sync circuit's 202 output data. The selected data is stored into input data memory 204. Input data memory 204 is so designed as to hold plural fields of input data.

Further, image processor 205 having features of the present invention, buffer store 206, output data memory 207, central processing unit (CPU) 208, memory controller 209, and program memory 210 are shown in FIG. 1. Image processor 205 receives image data from input data memory 204 thereby performing necessary signal processing operations on the received image data. Image processor 205 is a common image processor shared between the MUSE-system processing and the NTSC-system processing. Buffer store 206 is so provided as to temporarily hold intermediate results of the processing by image processor 205, and the data held by buffer store 206 is further processed by image processor 205. Image processor 205 outputs final process results to output data memory 207 for storage. CPU 208 controls the operations of other circuits not shown, switch unit 203, and image processor 205. Data read operations from input data memory 204 and buffer store 206 are carried out under the control of memory controller 209, and data write operations into buffer store 206 and output data memory 207 are carried out under the control of memory controller 209. Program memory 210 is a memory to store instructions to be executed by CPU 208.

211 is an audio processor. 212 is a loudspeaker (LS). Audio processor 211 receives audio data and carries out necessary signal processing operations on the received audio data. Results of the signal processing operations are applied to LS 212 for signal-to-audible sound conversion.

213 is a post-process circuit. 214 is a CRT display controller. 215 is a CRT. Data stored in output data memory 207 is suitably processed by post-process circuit 213, and the processed data is D/A-converted by CRT display controller 214. The result of the D/A-conversion operation is applied to CRT 215 where it is displayed, and post-process circuit 213 and CRT display controller 214 each operate in response to sync signals from MUSE sync circuit 201 and NTSC sync circuit 202.

Referring now to FIG. 2, the internal structure of image processor 205 of FIG. 1 is described. Image processor 205 has arithmetic units 1–4. Each arithmetic unit 1–4 performs arithmetic operations (e. g, filter operations) on data given. 13a and 13b are register sets each of which is made up of five registers. Register set 13a, on the one hand, includes (a) four arithmetic control registers 5a, 6a, 7a, and 8a to hold arithmetic control information to designate contents of arithmetic operations including the type of arithmetic operation and factors to be used in the arithmetic operations and (b) one connection control register 12a to hold connection control information which will be described later. On the other hand, register set 13b has likewise four arithmetic control registers 5b, 6b, 7b, and 8b and one connection control register 12b.

Bus switch 9 within image processor 205 has eight input data lines and five output data lines. Bus switch 9 establishes the detachable and interchangeable connections of the eight input data lines with the five output data lines. Four of the five output data lines of bus switch 9 are connected to respective input terminals of arithmetic units 1–4, and the remaining one output data line is extended to outside image processor 205 to establish connection with buffer store 206 and with output data memory 207. 10 indicates a line memory. 20 indicates an input selector, or input select circuit. Input selector 20 performs selection between the data held by input data memory 204 and the data held by buffer store 206. Line memories 10 are so structured as to hold 4-line input data, thereby storing data selected by input selector 20 and data supplied directly from input data memory 204. Whereas four of the eight input data lines of bus switch 9 are connected to line memories 10, the remaining four input data lines are connected to respective output terminals of arithmetic units 1–4. Connection control registers 12a and 12b each store connection control information to designate connection ways of the eight input data lines with the five output data lines of bus switch 9.

Image processor 205 further includes switch circuit 14, switch control circuit 15, and register update circuit 17. Switch circuit 14 has five select circuits 23–27 for arithmetic units 1–4 and bus switch 9. Of these five select circuits 23–27, select circuit 23 associated with arithmetic unit 1 outputs to arithmetic unit 1 either of information held by arithmetic control register 5a of register set 13a and information held by arithmetic control register 5b of register set 13b. Select circuits 24–26 associated with arithmetic units 2–4 and select circuit 27 associated with bus switch 9 function the same way that select circuit 23 does. Switch control circuit 15 sends switch signals 16 to select circuits 23–27, wherein a desired register set is selected from among register set 13a and register set 13b. Register update circuit 17 updates information held by register set 13a and updates information held by register set 13b.

Figure 3:
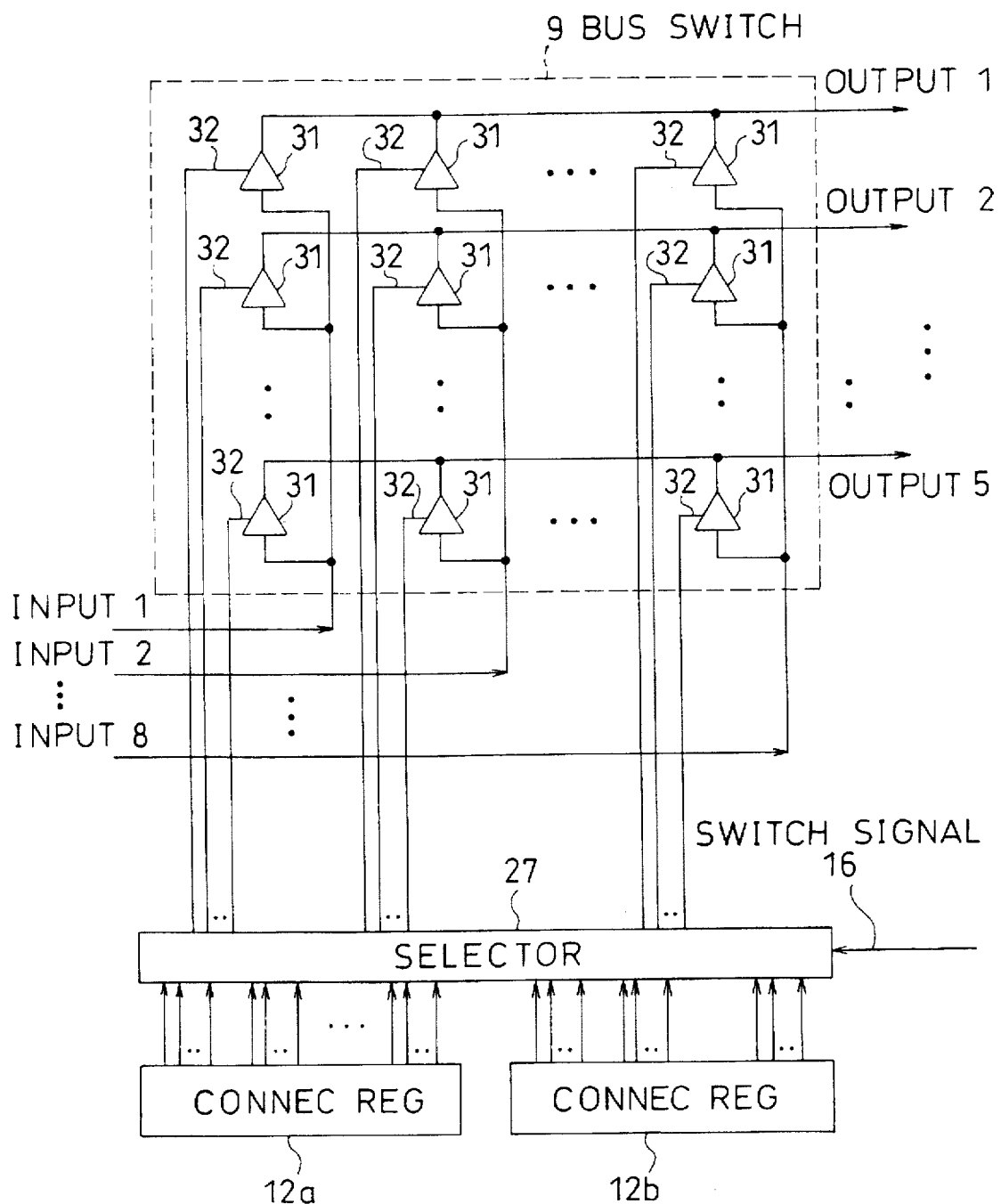
FIG. 3 is a circuit diagram illustrating the internal structure of a bus switch as shown in FIG. 2.

FIG. 3 is a circuit diagram showing the internal structure of bus switch 9 of FIG. 2. Bus switch 9, as shown in FIG. 3, has 40 bus drive circuits 31 arranged to look like a lattice so that bus switch 9 is able to establish arbitrary connections of the eight input data lines with the five output data lines. Each bus drive circuit 31 is connected to one of the eight input data lines as well as to one of the five output data lines of bus switch 9. Upon receipt of output control signal 32 at logic 1 from select circuit 27, bus drive circuit 31 outputs to its own output terminal data in accordance with the input data. On the other hand, if bus drive circuit 31 receives logic-zero output control signal 32, it keeps its own output at high impedance. Connection control registers 12a and 12b each hold logic values of output control signals 32 to be applied to 40 bus drive circuits 31. Select circuit 27 selects between connection control register 12a and connection control register 12b in accordance with switch signal 16 so as to provide 40 bus drive circuits 31 with output control signals 32. Bus switch 9 shown in FIG. 3 is also able to perform the function of simultaneously transferring a piece of input data onto a plurality of output data lines.

In the TV receiver of FIG. 1, CPU 208 controls the operation of switch unit 203 in accordance with the television system and sends instructions and data used for updating information held by each register set 13a and 13b, to register update circuit 17 of image processor 205. In addition, CPU 208 issues a message to switch control circuit 15. In response, switch control circuit 15 performs a selection between register set 13a and register set 13b.

In processing MUSE signals, switch unit 203 switches for the MUSE-system processing. This permits MUSE sync circuit's 201 output data to be supplied to image processor 205 through input data memory 204. In image processor 205, register update circuit 17 works to store arithmetic control information and connection control information to implement a series of algorithms for the MUSE-system processing, into register set 13a and into register set 13b. If register set 13a is chosen by the operations of switch circuit 14 and switch control circuit 15, this provides each arithmetic unit 1–4 with arithmetic control information and provides bus switch 9 with connection control information. This connects each arithmetic unit 1–4 one another via bus switch 9 so that the first half algorithm of the MUSE-system processing can be realized. Further, some of the four arithmetic units 1–4 can receive data read out of input data memory 204 through input selector 20, line memories 10, and bus switch 9. Results found by arithmetic units 1–4 are forwarded to buffer store 206 via bus switch 9 for storage. If register set 13b is selected by the operations of switch circuit 14 and switch control circuit 15, this provides each arithmetic unit 1–4 with new arithmetic control information and provides bus switch 9 with new connection control information. This establishes new connections of arithmetic units 1–4 via bus switch 9 so that the second half algorithm for the MUSE-system processing can be accomplished. Each arithmetic unit 1–4 receives data read out of input data memory 204 and buffer store 206. Results found by arithmetic units 1–4 are supplied to output data memory 207 via bus switch 9 for storage.

In processing NTSC signals, switch unit 203 switches for the NTSC-system processing. This permits NTSC sync circuit's 202 output data to be supplied to image processor 205 via input data memory 204. In image processor 205, register update circuit 17 works to store arithmetic control information and connection control information to implement a series of algorithms for the NTSC-system processing, into register set 13a. If register set 13a is selected by the operations of switch circuit 14 and switch control circuit 15, this provides each arithmetic unit 1–4 with arithmetic control information and provides bus switch 9 with connection control information. As a result of such arrangement, each arithmetic unit 1–4 is connected one another via bus switch 9 so that desired NTSC-system processing can be performed.

As described above, in accordance with the TV receiver of FIG. 1, four arithmetic units 1–4 within image processor 205 can be shared between the MUSE-system processing and the NTSC-system processing, and, in addition, they can be shared when performing a different algorithm during a signal processing (e.g., during the MUSE-system processing). Therefore, compared with the conventional technique requiring dedicated hardware for each television system, the present invention contributes to considerably reducing the TV receiver circuit size. It is possible to perform different operations on the same data stored in input data memory 204 by performing selection between register set 13a and register set 13b. Usually, it is necessary to change the control of arithmetic units 1–4 if there are differences in the filter factor caused by differences in the image data sampling location between the odd line and the even line. However, in accordance with the present invention, such a case can be dealt with by performing a switch from register set 13a to register set 13b and vice versa.

Figure 4:
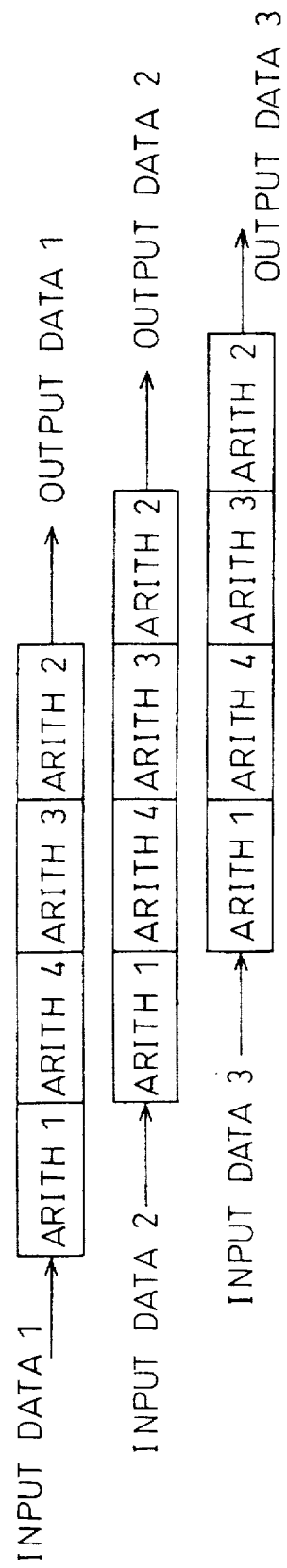
FIG. 4 is a descriptive diagram to describe pipelining by four arithmetic units as shown in FIG. 2.
Figure 5:
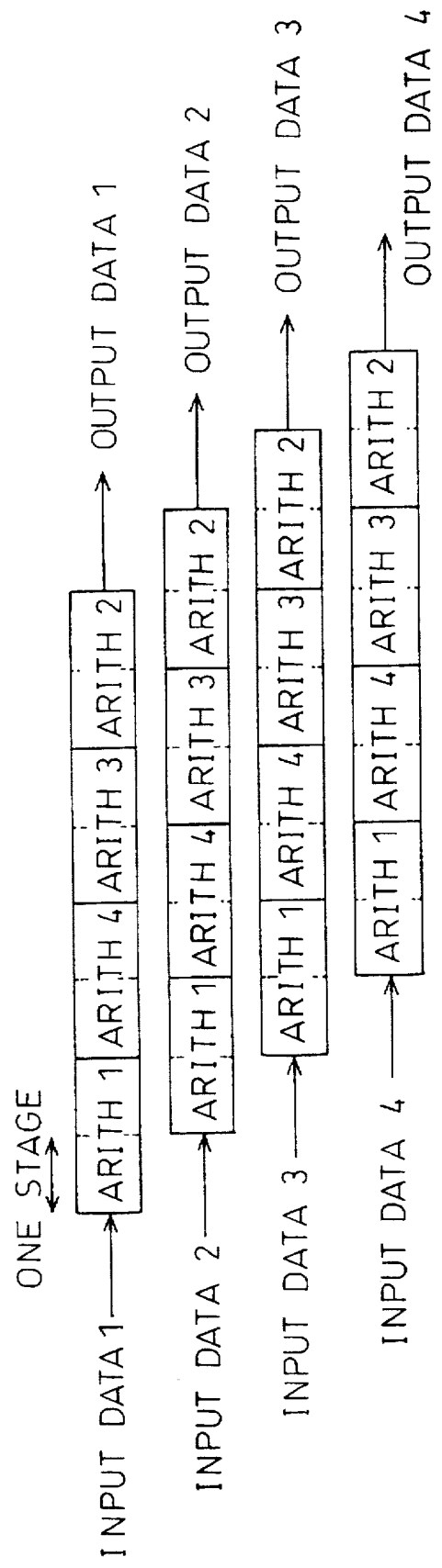
FIG. 5 is a descriptive diagram to describe pipelining in another form by the four arithmetic units.
Figure 6:
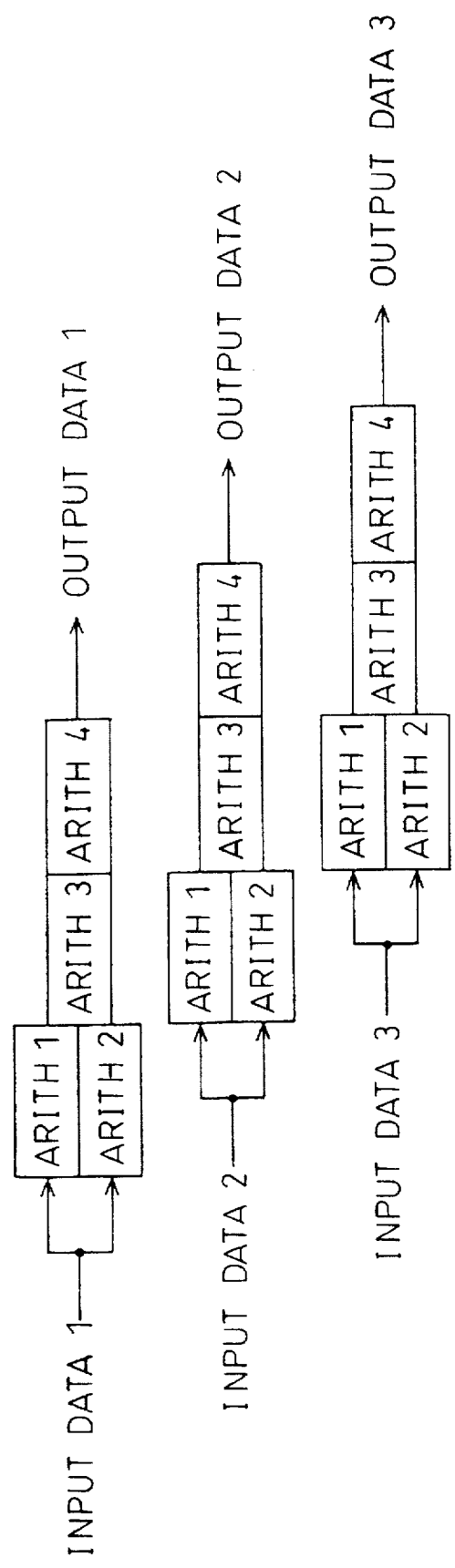
FIG. 6 is a descriptive diagram to describe pipelining in still another form by the four arithmetic units.

Arithmetic units 1–4 are capable of performing pipelining operations as shown in FIGS. 4–6. FIG. 4 shows an example in which arithmetic unit 1, arithmetic unit 4, arithmetic unit 3, and arithmetic unit 2 are connected in series in that order via bus switch 9. Input data is sequentially fed to arithmetic unit 1, and output data is sequentially provided from arithmetic unit 2. For example, while arithmetic unit 4 processes output data of arithmetic unit 1 in relation to first input data, arithmetic unit 1 processes second input data. Use of such pipelining operations can realize high-speed image processing. Further, as shown in FIG. 5, if the processing of each arithmetic unit 1–4 is divided into a plurality of stages, this further improves the processing efficiency compared with the pipelining of FIG. 4. FIG. 6 shows an example in which arithmetic units 1–4 are connected so that input data is processed in parallel by arithmetic units 1 and 2, and outputs of arithmetic units 1 and 2 are sequentially processed by arithmetic unit 3 and arithmetic unit 4. For example, while arithmetic unit 3 processes output data of arithmetic unit 1 and arithmetic unit 2 in relation to first input data, second input data is processed in parallel by arithmetic units 1 and 2.

As described above, the use of bus switch 9 of FIG. 3 enables arbitrary pipeline connections of arithmetic units 1–4 to be accomplished, and, depending on the processing contents, it is possible to omit the provision of some of 40 bus drive circuits 81. Each arithmetic unit 1–4 may employ an internal organization in which a plurality of sub-arithmetic units are connected in series or in series-parallel.

If, while one of register sets 13a and 13b is selected, register update circuit 17 updates information held by the other register set, this permits a high-speed switch between the MUSE-system processing and the NTSC-system processing to be performed. If three register sets are provided, this accomplishes a high-speed switch between the MUSE-system processing and the NTSC-system processing just by performing a register set switch.

Instead of using register sets 13a and 13b of FIG. 2, two sets of ROMs (Read Only Memories) to hold arithmetic control information of each arithmetic unit 1–4 and connection control information of bus switch 9 may be employed. In this case, information held by ROM is fixed, so that there is no need to provide register update circuit 17. Switch circuit 14 and switch control circuit 15 operate to select either of the two ROM sets for the switching of image processor's 205 process.

EXAMPLE 2

Figure 7:
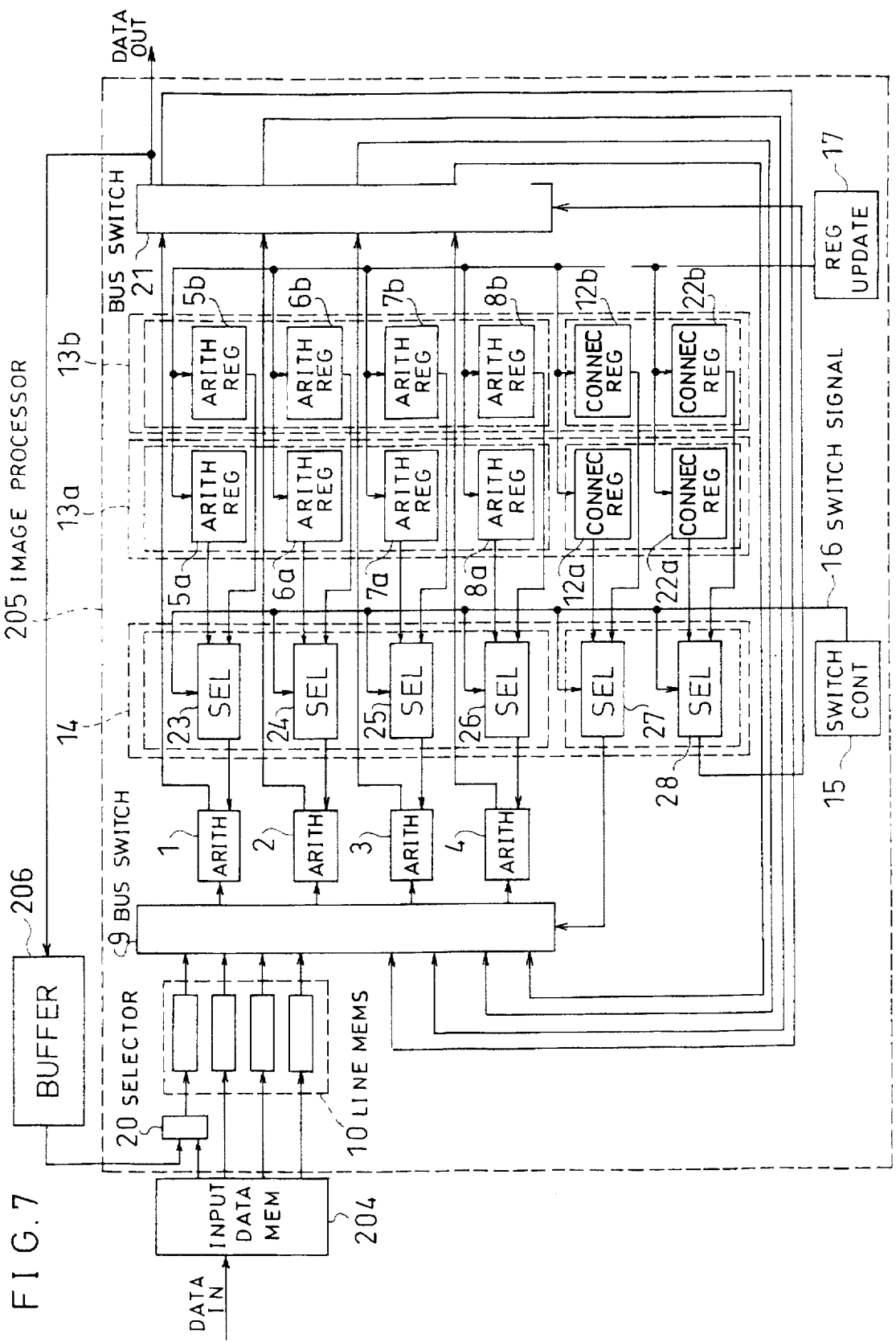
FIG. 7 is a block diagram depicting the structure of a signal processor of a second embodiment of the present invention.

FIG. 7 is a block diagram showing the structure of a signal processor according to a second embodiment of the present invention. Image processor 205 of FIG. 7 has two bus switches, namely first bus switch 9 and second bus switch 21. First bus switch 9 has eight input data lines and four output data lines. First bus switch 9 establishes the detachable and interchangeable connections of the eight input data lines with the four output data lines. The four output data lines of bus switch 9 are connected to respective input terminals of arithmetic units 1–4. Second bus switch 21 has four input data lines and five output data lines. Second bus switch 21 establishes the detachable and interchangeable connections of the four input data lines with the five output data lines. The four input data lines of bus switch 21 are connected to respective output terminals of arithmetic units 1–4. Further, four of the five output data lines of second bus switch 21 are connected to four of the eight input data lines of first bus switch 9, and the remaining one output data line is extended to outside image processor 205 to establish connection with buffer store 206 and with output data memory 207 (see FIG. 1). The remaining four input data lines of first bus switch 9 are connected to line memories 10.

Register set 13a has four arithmetic control registers 5a, 6a, 7a, and 8a and two connection control registers 12a and 22a. Likewise, register set 13b has four arithmetic control registers 5b, 6b, 7b, and 8b and two connection control registers 12b and 22b. Two of the four connection control registers, namely connection control registers 12a and 12b are registers to hold connection control information for first bus switch 9, and the remaining two connection control registers (i.e., connection control registers 22a and 22b) are registers to hold connection control information for second bus switch 21.

Switch circuit 14 has six select circuits 23–28 for first and second bus switches 9 and 21 and arithmetic units 1–4. Of these six select circuits, select circuit 28 associated with second bus switch 21 selects either of information held by connection control register 22a of register set 13a and information held by connection control register 22b of register set 13b, thereby outputting the selected information to second bus switch 21. Select circuits 23–26 for arithmetic units 1–4 and select circuit 27 for first bus switch 9 function the same way that select circuit 28 does. Switch control circuit 15 sends switch signals 16 to select circuits 23–28, wherein a desired register set is selected from among register set 13a and register set 13b. Register update circuit 17 updates information held by register set 13a and also updates information held by register set 13b.

Image processor 205 of the present embodiment has first and second bus switches 9 and 21. This makes it possible to establish the connections of arithmetic units 1–4 with broad flexibility while simplifying the internal structures of first and second bus switches 9 and 21. First bus switch 9 does not necessarily need to establish the arbitrary connections of the eight input data lines with the four output data lines, neither does second bus switch 21.

EXAMPLE 3

Figure 8:
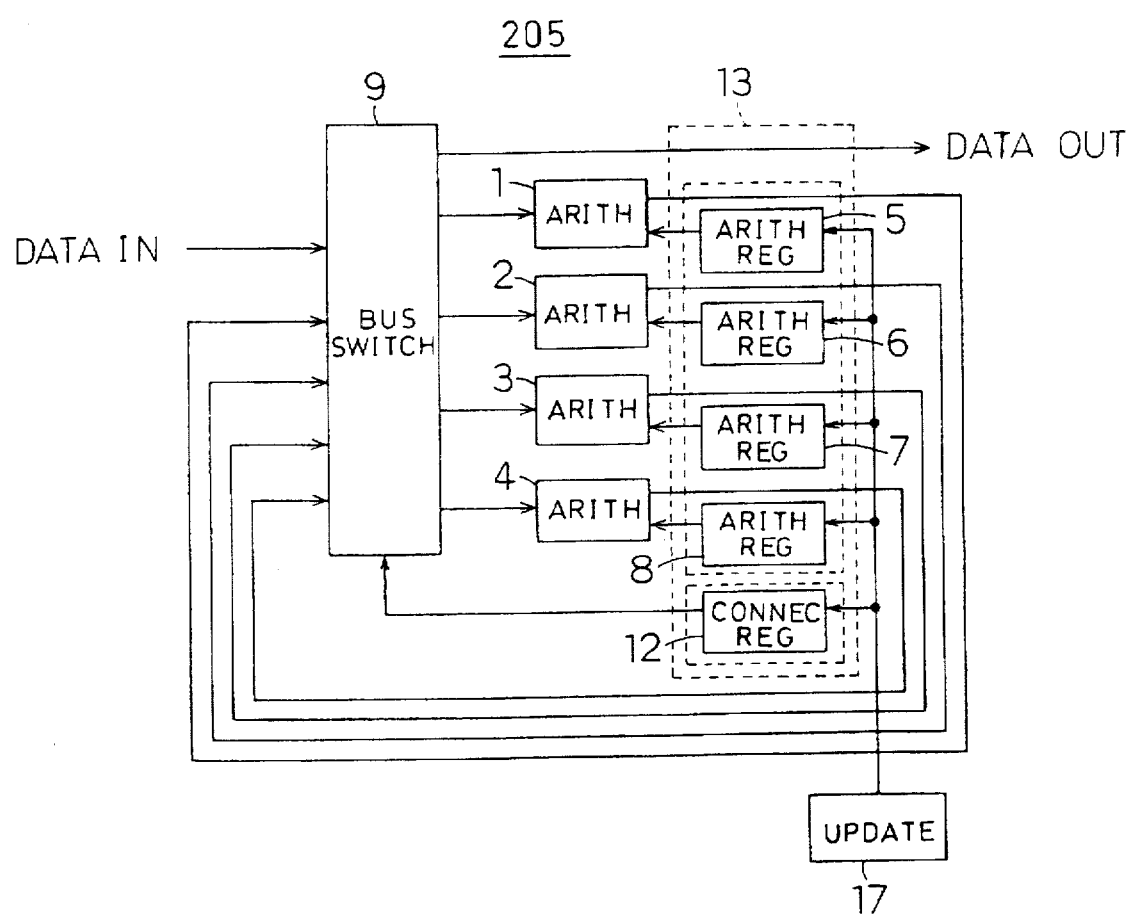
FIG. 8 is a block diagram depicting the structure of a signal processor of a third embodiment of the present invention.

FIG. 8 is a block diagram illustrating the structure of a signal processor of a third embodiment of the present invention. Image processor 205 of FIG. 8 does not function to perform selection between register sets, since there is provided only one register set 13. Bus switch 9 has five input data lines and five output data lines. Bus switch 9 establishes the detachable/interchangeable connections of the five input data lines with the five output data lines. Four of the five output data lines of bus switch 9 are brought into connection with input terminals of arithmetic units 1–4, whereas the remaining one output data line extends to outside image processor 205. Four of the five input data lines of bus switch 9 are brought into connection with output terminals of arithmetic units 1–4, whereas the remaining one input data line extends to outside image processor 205. Register set 13 has arithmetic control registers 5–8 to hold arithmetic control information of arithmetic units 1–4 and a single connection control register 12 to hold connection control information of bus switch 9. Register update circuit 17 works to update information held by register set 13.

In accordance with the present embodiment, the switching of the process of image processor 205 can be performed by updating information held by register set 13 using register update circuit 17. Although the time taken for the process switch becomes slightly longer than the register set switch method, the present embodiment makes compensation for such a delay by implementing image processor 205 with less circuitry.

EXAMPLE 4

Figure 9:
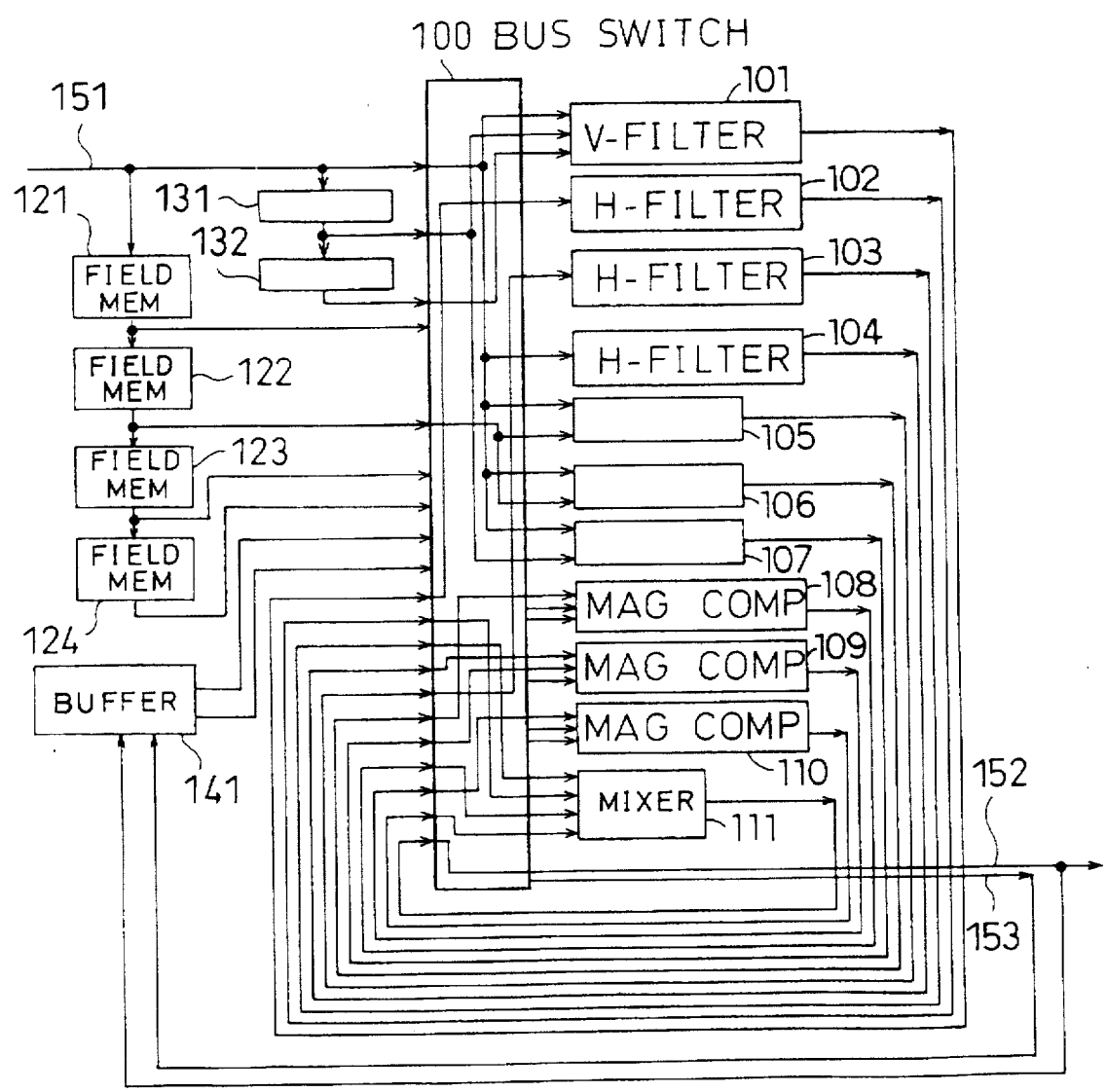
FIG. 9 is a block diagram depicting the structure of a signal processor of a fourth embodiment of the present invention and also showing the interconnection of a bus switch in performing the EDTV-system processing.
Figure 10:
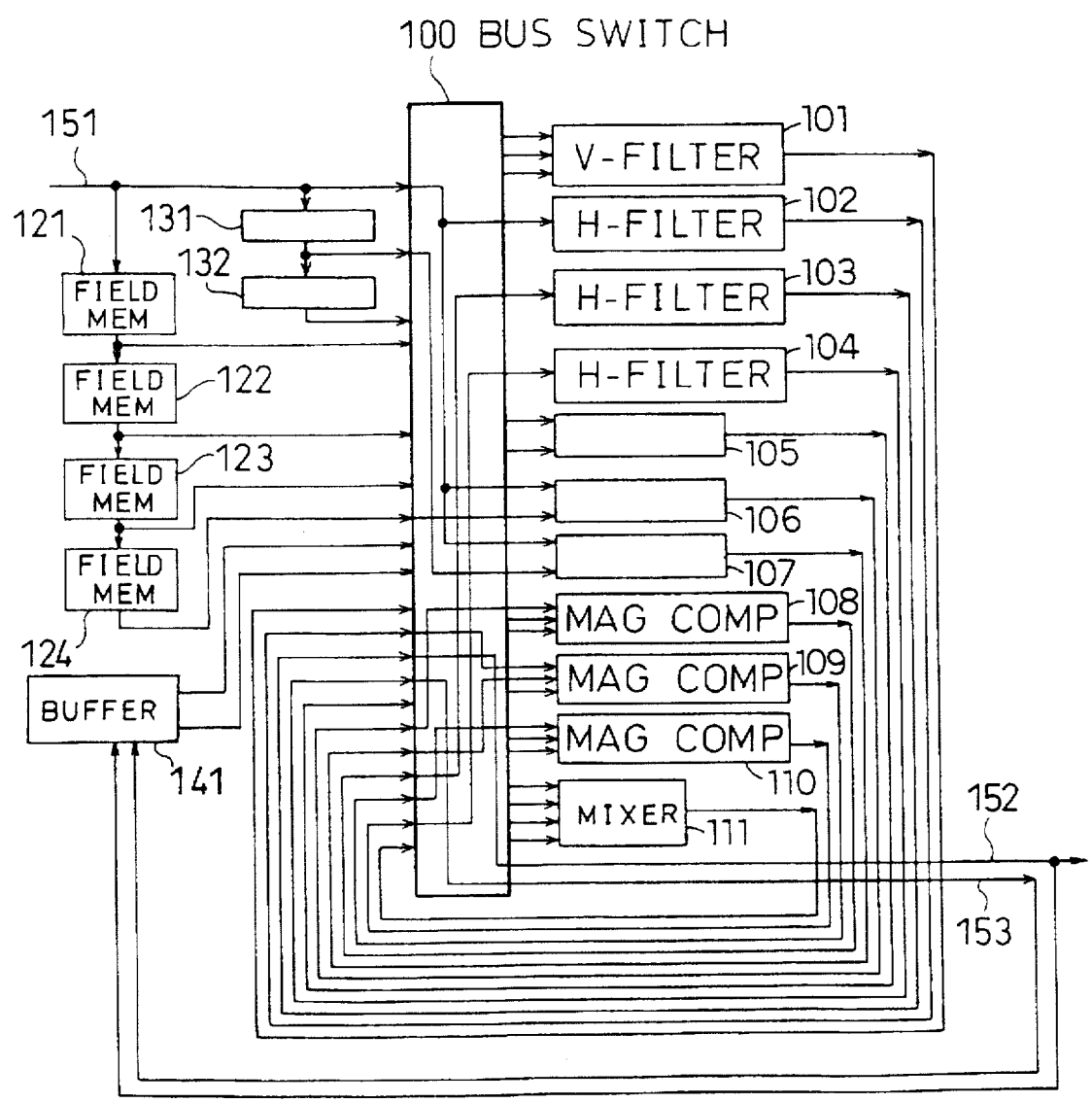
FIG. 10 is a diagram similar to FIG. 9, but in performing a movement detection process of the MUSE-system processing with the fourth embodiment signal processor.
Figure 11:
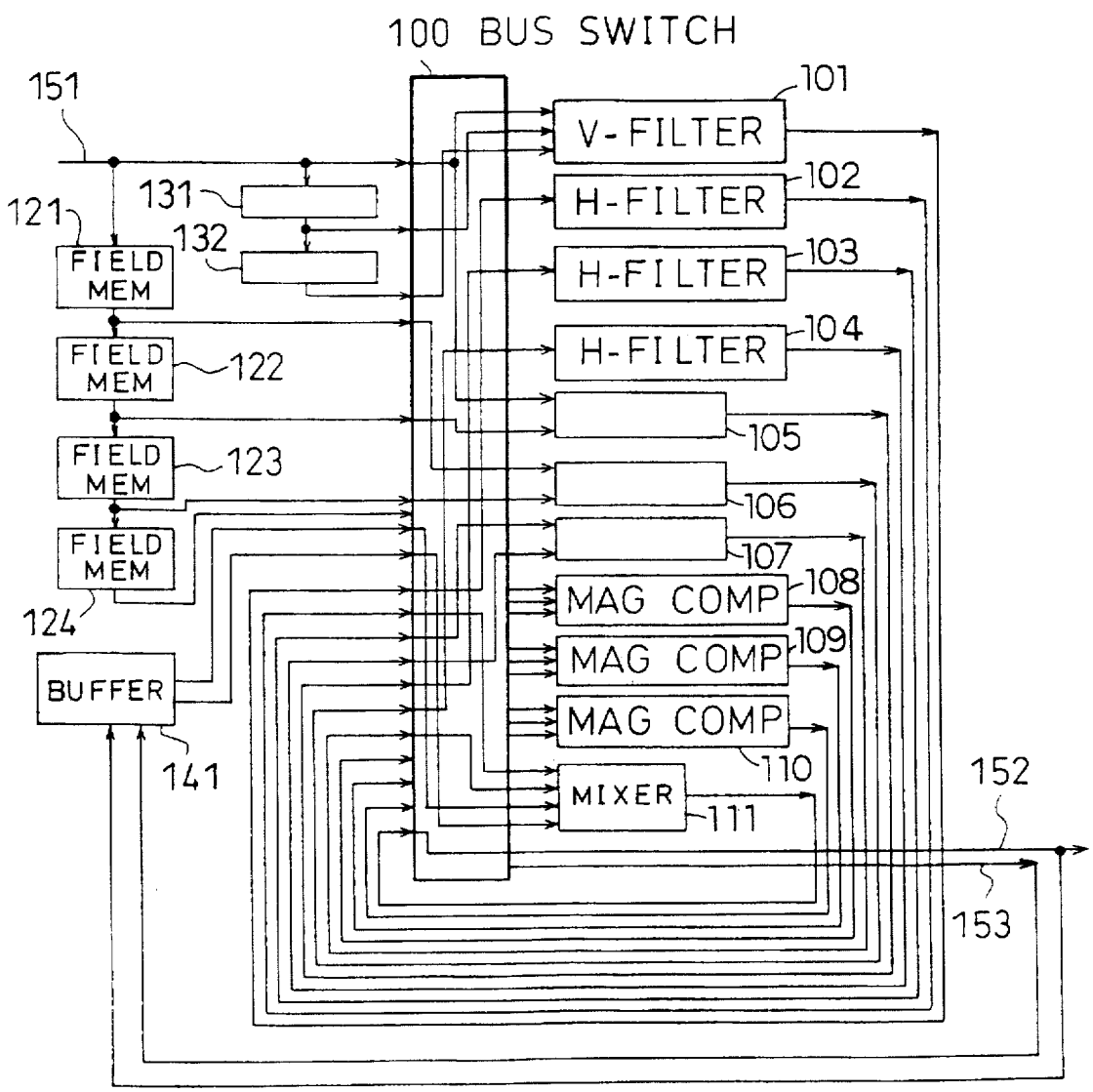
FIG. 11 is a diagram similar to FIG. 9, but in performing an image-without/with-movement process of the MUSE-system processing with the fourth embodiment signal processor.

Referring now to FIGS. 9–11, a signal processor of a fourth embodiment of the present invention is structurally described, which is shared between the EDTV-system image processing and the MUSE-system image processing. FIG. 9 shows the internal connection of a bus switch to accomplish a series of algorithms for the EDTV-system image processing. FIG. 10 shows the internal connection of the bus switch to accomplish an algorithm For a movement detection process of the MUSE-system image processing. FIG. 11 illustrates the internal connection of the bus switch to accomplish other algorithms for the MUSE-system image processing.

The present embodiment is directed to a signal processor comprising the following: one bus switch 100, eleven arithmetic units 101–111, one buffer store 141, one input data bus 151, first output data bus 152, and second output data bus 153. Reference numeral 101 indicates a vertical filter having three input signal lines and one output signal line. Reference numerals 102–104 indicate horizontal Filters each of which has one input signal line and one output signal line. Reference numerals 105–107 indicate add/interpolation circuits (AICs) each of which has two input signal lines and one output signal line. Reference numerals 108–110 indicate magnitude comparators, each magnitude comparator 108–110 having three input signal lines and one output signal line. 111 denotes a mixer with four input signal lines and one output signal line. Bus switch 100 has 20 input data lines and 27 output data lines and has the ability of establishing the detachable/interchangeable connections of the 20 input data lines with the 27 output data lines. Of the 27 output data lines of bus switch 100, 25 output data lines are connected to input signal lines of arithmetic units 101–111, and the remaining two output data lines, serving as first and second output data buses 152 and 153, are connected to input terminals of buffer store 141. First output data bus 152 branches off to outside the signal processor. Eleven of the 20 input data lines of bus switch 100 are connected to output signal lines of arithmetic units 101–111, and two other input data lines are is connected to output terminals of buffer store 141.

The signal processor of the present embodiment further includes first field memory 121, second field memory 122, third field memory 123, fourth field memory 124, first line memory 131, and second line memory 132. Input data bus 151 is sequentially fed input data for each pixel. With respect to pixel data currently existing on input data bus 151, (a) first field memory 121 outputs pixel data one field before, (b) second field memory 122 outputs pixel data one frame before, (c) third field memory 123 outputs pixel data three fields before, and (d) fourth field memory 124 outputs pixel data two frames before. With respect to pixel data currently existing on input data bus 151, first line memory 131 outputs pixel data one line before, and second line memory 132 outputs pixel data two lines before. All the outputs of field memories 121–124 and line memories 131–132 and the pixel data currently existing on input data bus 151 are supplied to the remaining seven input data lines of bus switch 100.

The signal processor of the present embodiment further includes register set 13a, register set 13b, switch circuit 14, switch control circuit 15, and register update circuit 17 of FIG. 2, but they are not shown in FIGS. 9–11.

FIG. 12 shows the internal structure of vertical filter 101. Vertical filter 101 has three multipliers 40 and one adder 41 and performs an arithmetic operation expressed as follows:

$$A1 \times D1 + A2 \times D2 + A3 \times D3$$

where A1, A2, A3 are factors and D1, D2, D3 are input data. This is a 3-tap vertical filter operation. An arithmetic control register of register set 13a and an arithmetic control register of register set 13b hold different factor sets of A1–A3 as arithmetic control information. In response to switch signal 16, a select circuit of switch circuit 14 selects either one of register set 13a and register set 13b and provides a factor set of A1–A3 held by the selected register set to three multipliers 40.

Figure 13:
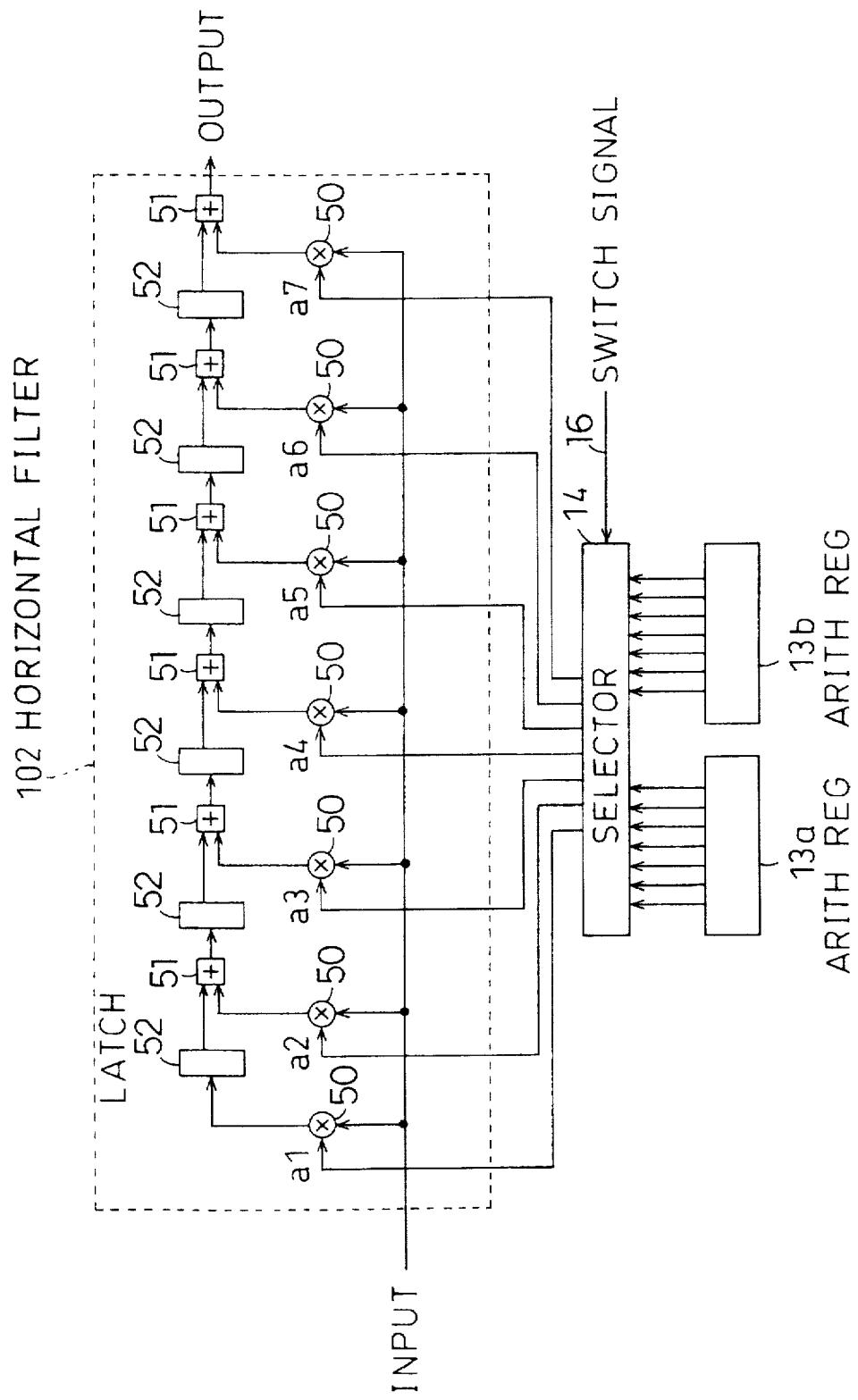
FIG. 13 is a block diagram showing the internal structure of a horizontal filter which is another arithmetic unit shown in FIGS. 9–11 and also showing a control circuit thereof.

FIG. 13 shows the internal structure of horizontal filter 102 (103, 104). Horizontal filter 102 has seven multipliers 50, six adders 51, and six latches 52 and performs an arithmetic operation expressed as follows:

$$a1 \times di + a2 \times d(i+1) + a3 \times d(i+2) + a4 \times d(i+3) + a5 \times d(i+4) + a6 \times d(i+5) + a7 \times d(i+6)$$

where a1–a7 are factors and di is the i-th input data. This is a 7-tap horizontal filter operation. The switching of the factors a1 to a7 is carried out the same way as the one described with reference to FIG. 12.

Figure 14:
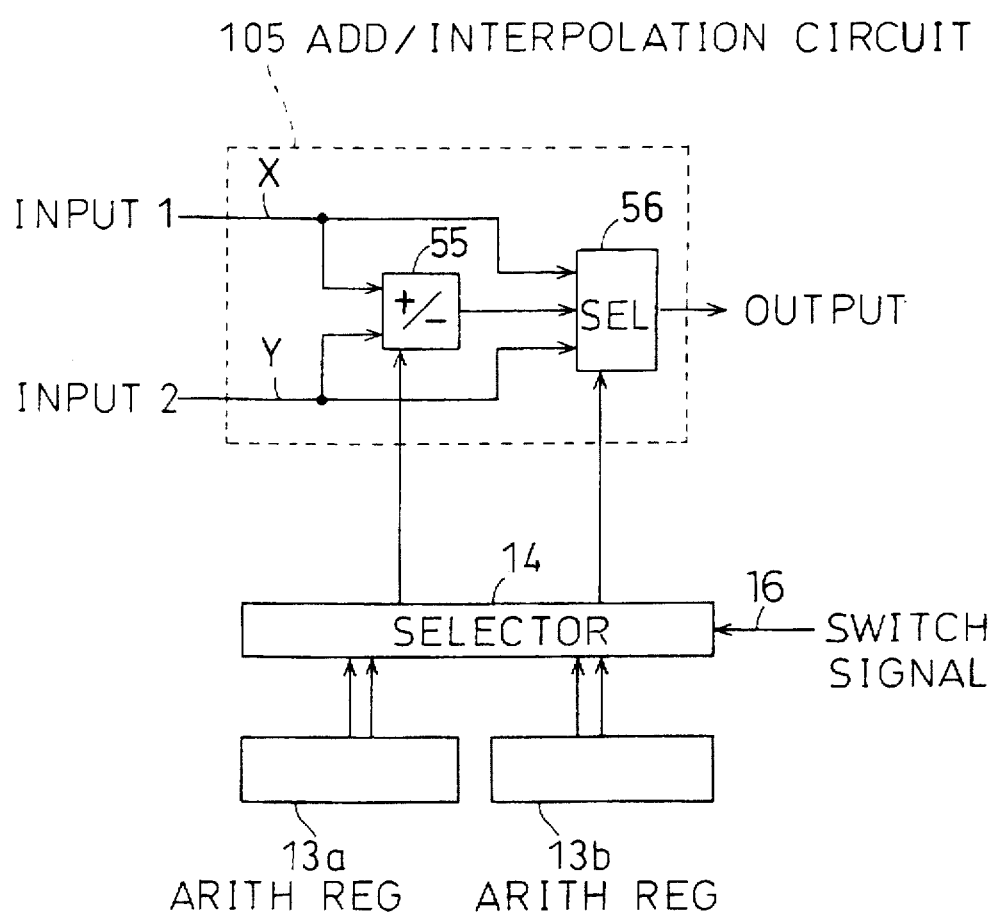
FIG. 14 is a block diagram showing the internal structure of an add/interpolation circuit which is still another arithmetic unit shown in FIGS. 9–11 and also showing a control circuit thereof.

Shown in FIG. 14 is the internal structure of AIC 105 (106, 107). AIC 105 has adder/subtracter 55 and output select circuit 56. AIC 105 receives input data X and input data Y and provides either (X+Y), (X−Y), X, or Y. An arithmetic control register of register set 13a and an arithmetic control register of register set 13b each hold arithmetic control information to designate the type of arithmetic operation. The held arithmetic control information determines which one of (X+Y) and (X−Y) to be output from adder/subtracter 55, and further determines which one of input data X, input data Y, and the output of adder/subtracter 55 to be output selectively from output select circuit 56. In response to switch signal 16, a select circuit of switch circuit 14 performs selection between register set 13a and register set 13b, thereby providing arithmetic control information held by the selected register set to adder/subtracter 55 and to output select circuit 56.

FIG. 15 shows the internal structure of magnitude comparator 108 (109, 110). Magnitude comparator 108 has first MAX/MIN circuit 61, second MAX/MIN circuit 62, third MAX/MIN circuit 63, fourth MAX/MIN circuit 64, nine latches 65 for synchronization, and two input select circuits 66. Magnitude comparator 108 receives input data X, input data Y, and input data Z and is so organized as to extract either the maximum of these input data X, Y, Z, the minimum, or the intermediate. Each MAX/MIN circuit 61–64 receives two inputs thereby providing either the greater of the received two inputs, the smaller of the received two inputs, or any one of the received two inputs regardless of their values, depending on the given designation. Two input select circuits 66 are provided so as to simultaneously take in three items of pixel data applied in parallel to first to third input signal lines 67–69, and to sequentially take in three items of pixel data in series applied to first input signal line 67. The switching of the operations of MAX/MIN circuits 61–64 and the switching of the operations of input select circuits 66 are carried out the same way as the one described with reference to FIG. 14.

If each MAX/MIN circuit 61–64 receives two inputs and is so instructed as to output the greater of the two inputs, then the greatest of input data X, Y, and Z is extracted. If, on the other hand, each MAX/MIN circuit 61–64 is so instructed as to output the smaller of the two inputs, then the smallest of input data X, Y, and Z is extracted. For the case of the maximum value extraction setting or the minimum value extraction setting, it is possible to make a magnitude comparison only between data X on first input signal line 67 and data Y on second input signal line 68. Where first and third MAX/MIN circuits 61 and 63 are so instructed as to output the greater of two inputs and second and fourth MAX/MIN circuits 62 and 64 are so instructed as to output the smaller of two inputs, then the intermediate of input data X, Y, and Z is extracted. FIG. 15 shows an example of this in which data Y is extracted because Z>Y>X. This removes isolated points from pixel data continuously applied to first input signal line 67.

Figure 16:
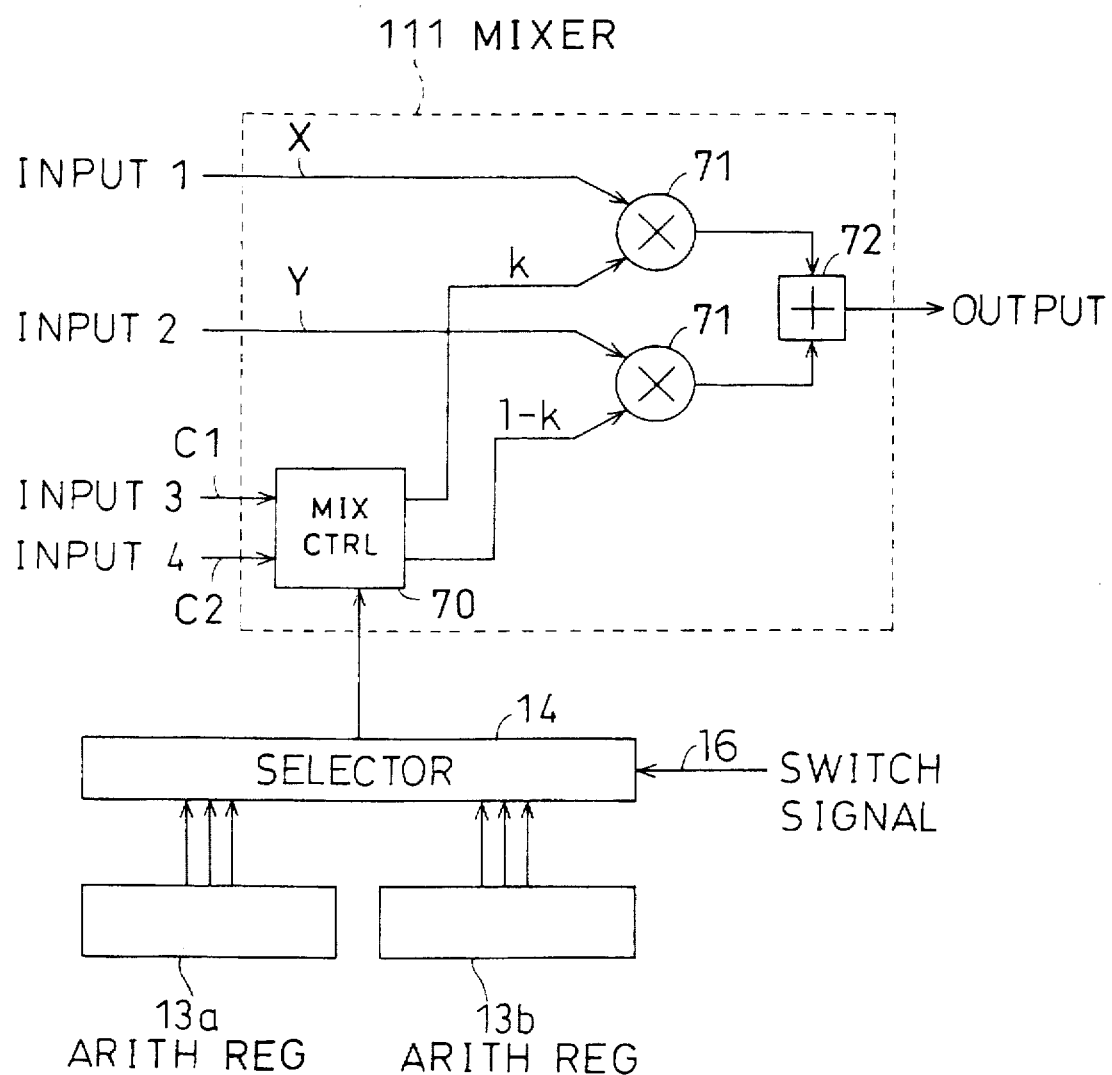
FIG. 16 is a block diagram showing the internal structure of a mixer which is a still further arithmetic unit shown in FIGS. 9–11 and also showing a control circuit thereof.

FIG. 16 shows the internal structure of mixer 111. Mixer 111 has mixing control circuit 70, two multipliers 71, and adder 72. Mixer 111 performs an arithmetic operation expressed as follows:

$$kX+(1-k)Y$$

where X and Y are pixel data given. Mixing control circuit 70 determines two factors, k and (1–k), according to control data C1, control data C2, and arithmetic control information from a select circuit of switch circuit 14.

Figure 17:
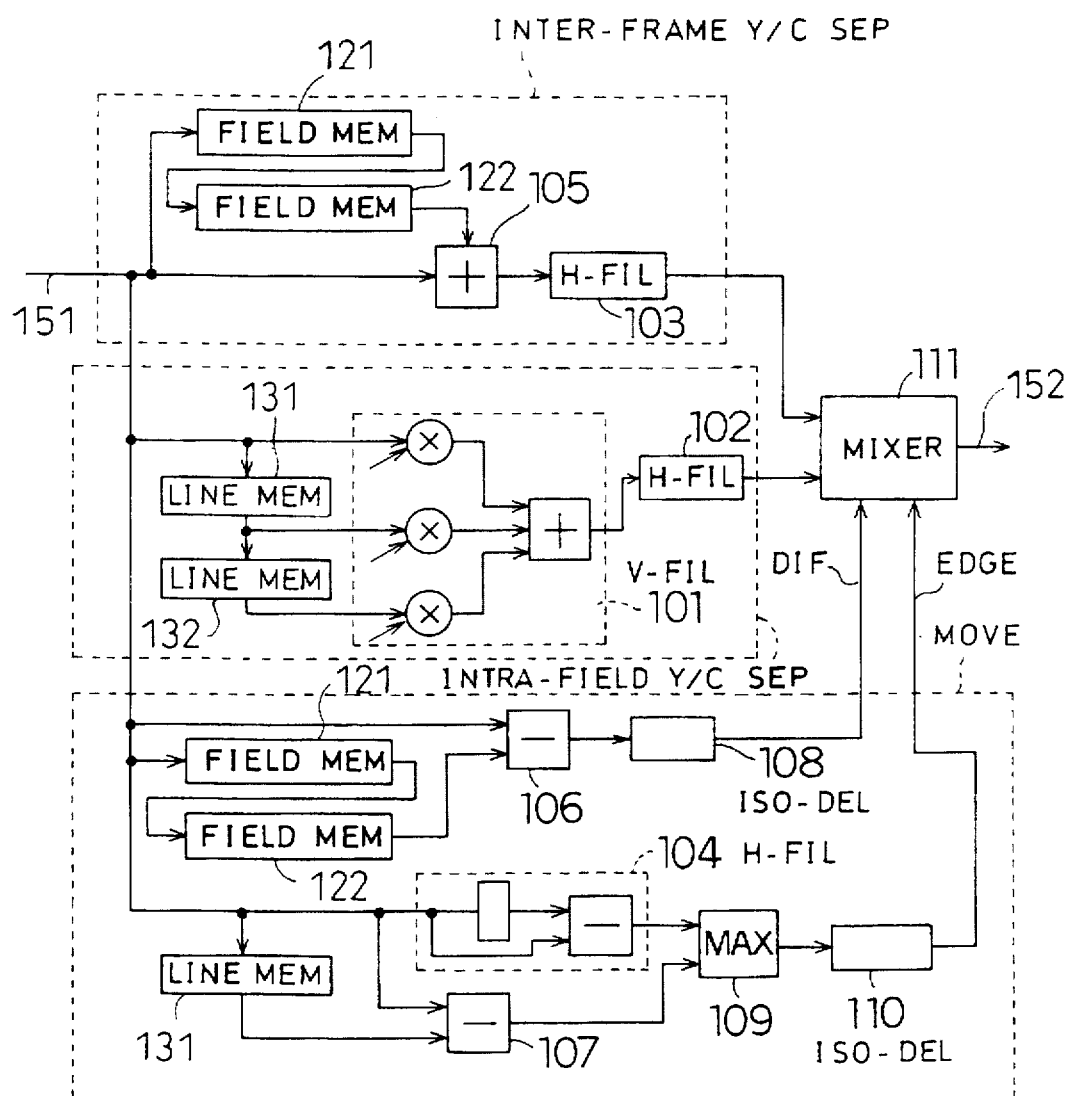
FIG. 17 flowcharts the EDTV-system processing of FIG. 9.

FIG. 17 shows the signal processing (i.e., EDTV-system processing) of FIG. 9 in the form of a flowchart. The EDTV-system processing, accomplished by the connection as shown in FIG. 9, contains a movement detection process, an inter-frame Y/C separation process, an intra-field Y/C separation process, and a mixing process. Of these processes, the inter-frame Y/C separation process is one for images without movement, and the intra-field Y/C separation process is one for images with movement. Results of these Y/C separation processes are mixed according to the amount of image movement. The amount of image movement is detected as a 1-frame difference in the movement detection process. In consideration of the fact that the value of difference is likely to increase by slight image movement around the edge of an image, the amount of edge is therefore evaluated, in addition to the 1-frame difference, in the mixing process. The amount of edge, together with the 1-frame difference, is detected in the movement detection process. The movement detection process, the inter-frame Y/C separation process, and the intra-field Y/C separation process are concurrently executed.

As shown in FIG. 17, the movement detection process is accomplished by one horizontal filter 104, two AIC's 106, 107, three magnitude comparators 108, 109, 110, two field memories 121, 122, and one line memory 131. The 1-frame difference is found as follows. AIC 106 is used to find a difference between pixel data currently existing on input data bus 151 and one-frame-before pixel data output by second field memory 122, and magnitude comparator 108 is used to remove isolated points from the difference found by AIC 106 to find a 1-frame difference. The horizontal difference and the vertical difference within the same field are compared, and the greater of these differences serves as the edge amount. The horizontal difference within the same field, or the difference between adjoining pixel data on the same line, is detected by horizontal filter 104 from pixel data on input data bus 151, at the time of which two multipliers of horizontal filter 104 are employed and these two multipliers' factors are set to 1 and –1. The vertical difference within the same field, or the difference between pixels of the adjoining two lines is detected by finding a difference between pixel data currently existing on input data bus 151 and one-line-before pixel data output from first line memory 131 by means of AIC 107. Magnitude comparator 109 makes a comparison in magnitude between a difference found by horizontal filter 104 and a difference found by AIC 107 thereby selecting the greater of the differences. Magnitude comparator 110 then removes isolated points from the result found by magnitude comparator 109 to obtain the edge amount. The obtained 1-frame difference and edge amount are supplied to mixer 111 as control data C1 and as control data C2.

The inter-frame Y/C separation process is accomplished by one horizontal filter 103, one AIC 105, and two field memories 121, 122. In the first place, AIC 105 performs an addition operation of pixel data currently existing on input data bus 151 and one-frame-before pixel data output from second field memory 122. Then, the sum thus found is subjected to a high-frequency component removal process performed by horizontal filter 103, and is supplied to mixer 111 as a result of the inter-frame Y/C separation process.

The intra-field Y/C separation process is accomplished by vertical filter 101, one horizontal filter 102, and two line memories 131, 132. Pixel data currently existing on input data bus 151, one-line-before pixel data output from first line memory 131, and two-lines-before pixel data output from second line memory 132 are processed by vertical filter 101, the result of which is further processed by horizontal filter 102. The output of horizontal filter 102 is supplied to mixer 111 as a result of the intra-field Y/C separation process.

The mixing process is accomplished by mixer 111. According to the 1-frame difference and the edge amount both obtained by the movement detection process, a result of the inter-frame Y/C separation process (i.e., an output of horizontal filter 103) and a result of the intra-field Y/C separation process (i.e., an output of horizontal filter 102) are mixed together by mixer 111, and the result of the mixing operation is delivered onto first output data bus 152.

Figure 18:
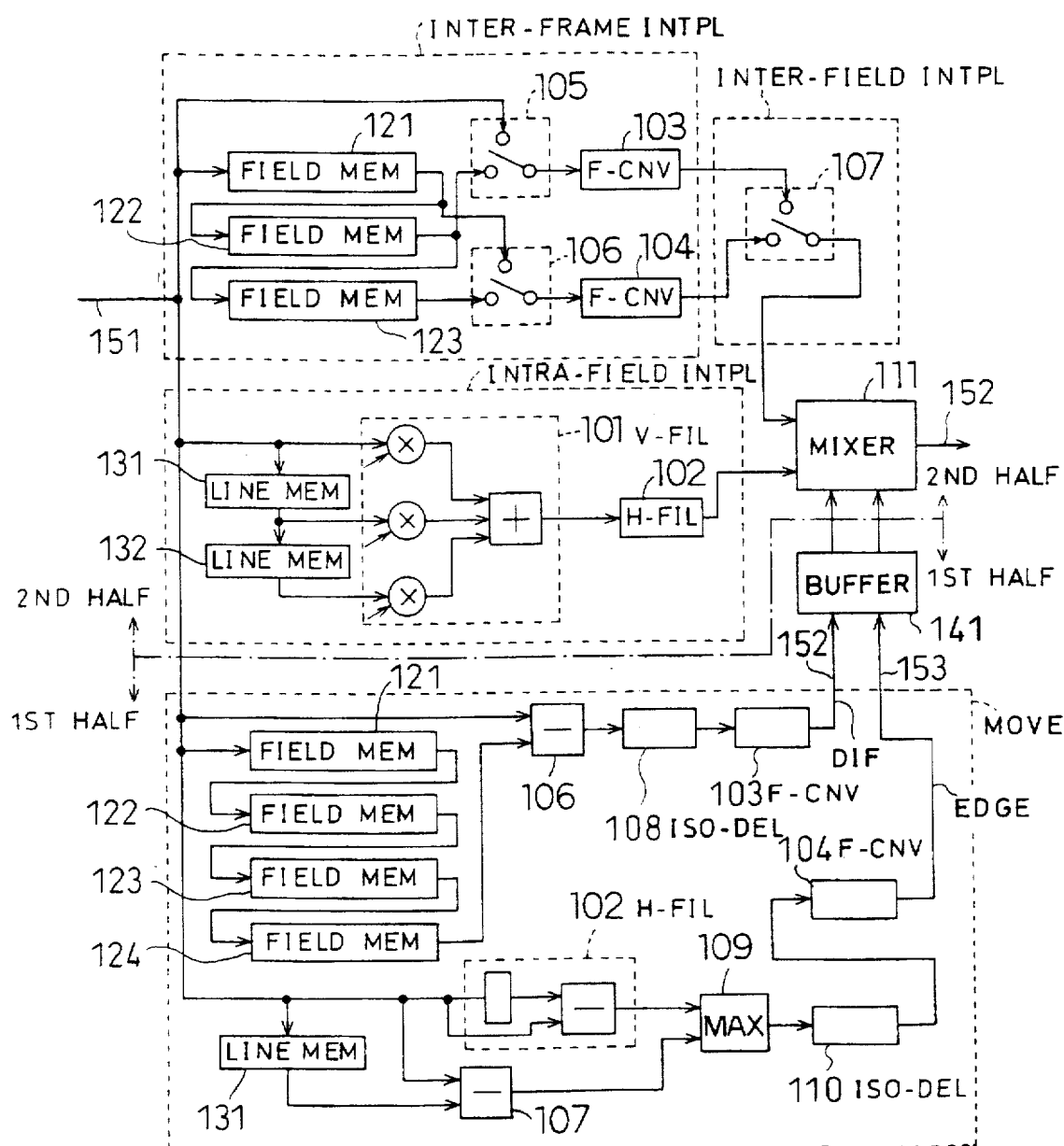
FIG. 18 flowcharts the MUSE-system processing of FIGS. 10 and 11.

FIG. 18 flowcharts the signal processing (i.e., the MUSE-system processing) of FIGS. 10 and 11. The MUSE-system processing, accomplished by the connections of FIGS. 10 and 11, contains a movement detection process, an inter-frame interpolation process, an inter-field interpolation process, an intra-field interpolation process, and a mixing process. Of these processes, the inter-frame interpolation process and the inter-field interpolation process are processes for images without movement, and the intra-field interpolation process is a process for images with movement. The results of the image-with-movement process and the image-without-movement process are mixed together in accordance with the amount of image movement. The image movement amount is detected as a 2-frame difference in the movement detection process. From the same reason mentioned previously, the edge amount, in addition to the 2-frame difference, is evaluated in the mixing process. This edge amount is detected in the movement process together with the 2-frame difference. The movement detection process is accomplished by the connection of FIG. 10, and the remaining other processes are accomplished by the connection of FIG. 11. The 2-frame difference and the edge amount both obtained by the movement detection process in the first-half processing are temporarily held by buffer store 141 for the mixing process of the second-half processing, and switching between the FIG. 10 connection and the FIG. 11 connection is made each time one field of input image data is processed. The inter-frame interpolation process and the intra-field interpolation process of the second-half processing are performed in parallel with each other.

As is evident from FIG. 18, the movement detection process is accomplished by three horizontal filters 102–104, two AICs 106–107, three magnitude comparators 109–110, four field memories 121–124, and one line memory 131. The 2-frame difference is obtained as follows. First, AIC 106 finds a difference between pixel data currently existing on input data bus 151 and two-frames-before pixel data output from fourth field memory 124. The result thus found by AIC 106 is subjected to an isolated point removal process by magnitude comparator 108, and, thereafter, to a frequency conversion process by horizontal filter 103. As a result, the 2-frame difference is found. As in the previously described EDTV-system processing, with first line memory 131, horizontal filter 102, AIC 107, and magnitude comparator 109, the greater of the horizontal difference and the vertical difference within the same field serves as the edge amount. Magnitude comparator 110 removes isolated points from the output of magnitude comparator 109, and the result of the isolated point removal operation is frequency-converted by horizontal filter 104 to find the edge amount. The obtained 2-frame difference and edged amount are stored into buffer store 141 via first output data bus 152 and second output data bus 153.

The image-without-movement process of the second half processing is accomplished by two horizontal filters 103–104, three AICs 105–107, and three field memories 121–123. AIC 105 alternately selects pixel data currently existing on input data bus 151 and one-frame-before pixel data output from second field memory 122, to perform inter-frame interpolation operations. AIC 106 alternately selects one-field-before pixel data output from first field memory 121 and three-fields-before pixel data output from third field memory 123, to perform inter-frame interpolation operations. AIC 105 outputs data to horizontal filter 103. In response, horizontal filter 103 frequency-converts the received data, and the result of the frequency-conversion operation is fed to AIC 107. AIC 106 outputs data to horizontal filter 104. In response, horizontal filter 104 frequency-converts the received data, and the result of the frequency-conversion operation is fed to AIC 107. AIC 107 alternately selects the output of horizontal filter 103 and the output of horizontal filter 104, to perform inter-field interpolation operations. The output of AIC 107 is supplied to mixer 111 as a result of the image-without-movement process.

The image-with-movement is accomplished by vertical filter 101, one horizontal filter 102, and two line memories 131, 132. Pixel data currently existing on input data bus 151, one-line-before pixel data output from first line memory 131, and two-lines-before pixel data output from second line memory 132 are sequentially processed by vertical filter 101 and horizontal filter 102. Horizontal filter 102 not only serves as a two-dimensional filter for horizontal filter operations but also performs frequency conversion operations. Horizontal filter 102 output is supplied to mixer 111 as a result of the image-with-movement process.

The mixing process is accomplished by mixer 111. Mixer 111, according to the 2-frame difference and on the edge amount both read out of buffer store 141, mixes an image-without-movement process result (i.e., the output of AIC 107) and an image-with-movement process result (i.e., the output of horizontal filter 102), thereby outputting the result of the mixing operation onto first output data bus 152.

As described above, the present embodiment makes it possible for a piece of hardware to be shared between the EDTV-system processing and the MUSE-system processing. Additionally, because of the provision of buffer store 141, it is possible to divide a series of algorithms for the MUSE-system processing into two parts, so that these two parts can be performed using the same hardware. This arrangement greatly reduces the amount of hardware necessary for the signal processing compared with the conventional technique. As in the EDTV-system processing, the additional provision of three horizontal filters and two AICs to the present embodiment enables the concurrent execution of the movement detection process and the image-with/without-movement process of the MUSE-system processing, with buffer store 141 omitted.

In the present embodiment, as shown in FIGS. 12–16, each arithmetic unit 101–111 employs a firmware structure. This speeds up the processing rate as compared with using a general-purpose processor.

Further, in the present embodiment, two types of memory are employed. More specifically, a plurality of field memories (i.e., field memories 121–124) and a plurality of line memories (i.e., line memories 131–132) are used to hold input data. As a result of such arrangement, it is possible to freely handle data between two specific fields with a time distance therebetween or data between two specific lines with a time distance therebetween. However, it is possible to employ only one of the two types. RAM (random access memory) may be useful to freely read and handle pixel data required. Memory to hold input data may not be provided in cases requiring no processing between data with a time distance therebetween (e.g., audio processing).

As to the arithmetic unit count and the arithmetic unit type, they are arbitrary. For example, if a 5-tap vertical filter is needed, this requires a 5-stage line memory structure and a 5-input arithmetic unit to suit the 5-tap vertical filter. Use of a DCT (discrete cosine translation) arithmetic unit enables the processing of digital image compressed data.

Further, the switching between the FIG. 10 connection and the FIG. 11 connection may be made each time one line of input image data is processed. In this case, if line memories 131 and 132 are made to hold pixel data used for the movement detection process, the image-with/without-movement process can be performed using such held data. Instead of re-accessing first to third field memories 121–123 which are slow, line memories 131 and 132 which are fast can be accessed.

The above-described EDTV-system Y/C separation procedure is applicable in other television systems requiring the Y/C separation such as the NTSC system and EDTV II system. The present invention provides a TV receiver having the capability of being compatible with at least any two of various television systems including the foregoing systems, the PAL (Phase Alternation Line) system, the ATV (Advanced TV) system that is a digital television system, and the MUSE system.

The 7-tap horizontal filter of FIG. 13 has seven multipliers. Use of three multipliers forms a 3-tap horizontal filter. Several modifications of the horizontal filter of FIG. 13, which are 3-tap horizontal filters formed by one or two multipliers, are described below.

Modified Embodiment 1

Figure 19:
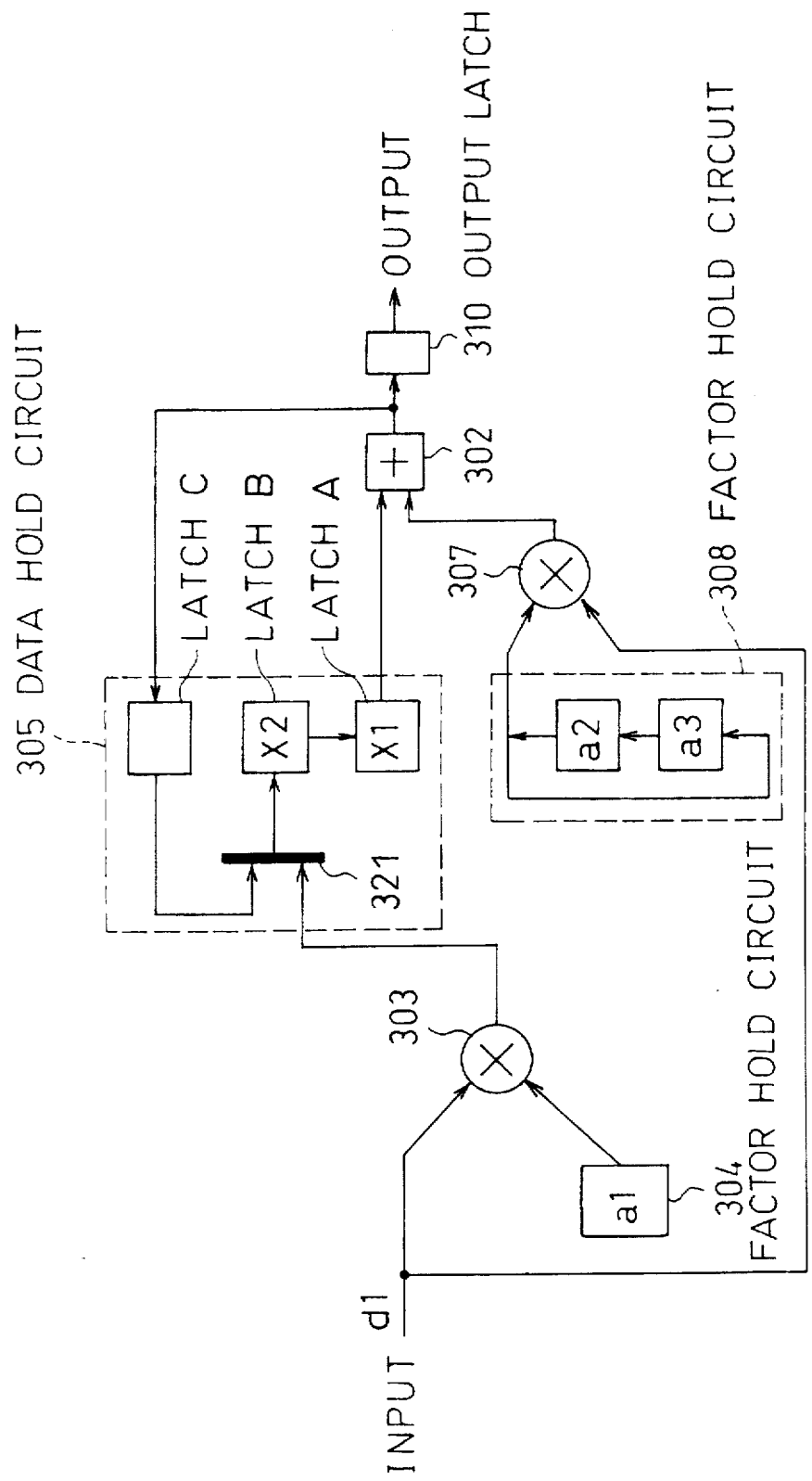
FIG. 19 is a block diagram showing the structure of a first modification of the horizontal filter of FIG. 13.

FIG. 19 is a block diagram showing the structure of a 3-tap horizontal filter according to a first modified embodiment of the present invention. FIG. 19 shows first multiplier 303, second multiplier 307, adder 302, and output latch 310. First factor hold circuit 304 is made up of a single latch. Second factor hold circuit 308 is made up of two latches, and these two latches are connected together to form a shift register. Data hold circuit 305 is made up of three latches A–C and one selector 321. Latch A and latch B are connected together to form a shift register. Clock signals (not shown) are applied to each component, for synchronization.

First and second multiplier 303 and 307 are fed in parallel input data for each pixel. This input data is updated at 2-clock cycle intervals. First multiplier 303 performs a multiplication operation of the input data by the output of first factor hold circuit 304. Second multiplier 307 performs a multiplication operation of the input data by the output of second factor hold circuit 308. The output of first multiplier 303 and the output of latch C are alternately selected by selector 321 to be stored into latch B. Adder 302 performs an addition operation of the output of latch A plus the output of second multiplier 307. The output of adder 302 is stored into latch C and is also provided to the outside at 2-clock cycle intervals via output latch 310. Latch C works to delay the output of adder 302 by 1-clock cycle to provide the delayed output to selector 321.

The following shows a way of implementing 3-tap horizontal filter operations with the above-described configuration. The horizontal filter of FIG. 19 performs an arithmetic operation of a1×di+a2×d(i+1)+a3×d(i+2) where a1, a2, and a3 are factors and di is the i-th input data. First factor hold circuit 304 holds a1, and second factor hold circuit 308 holds a2 and a3.

Figure 20:
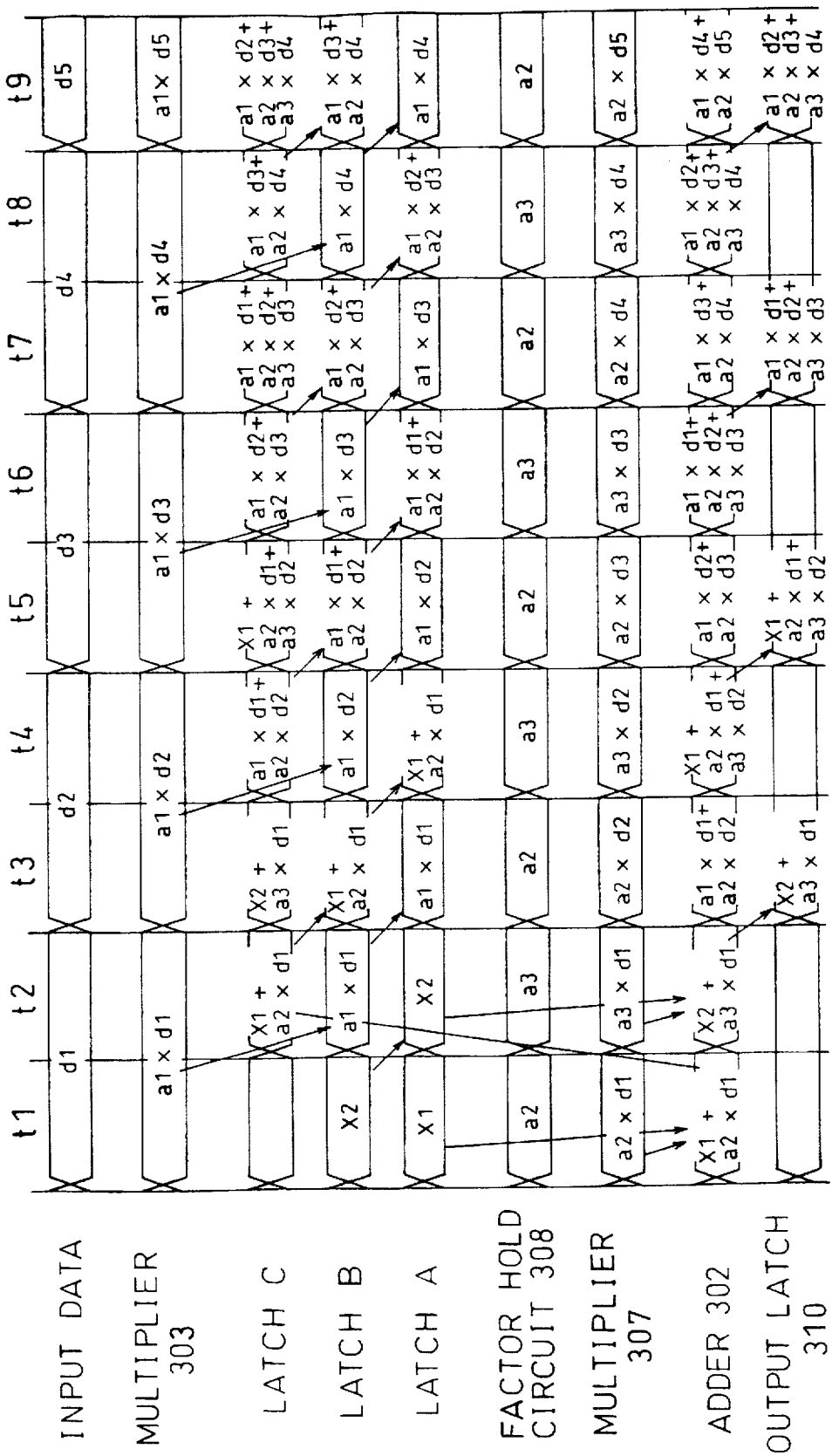
FIG. 20 is a timing diagram showing the operation of the horizontal filter of FIG. 19.

By making reference to FIG. 20, the operation of the horizontal filter of FIG. 19 is described below.

At cycle t1, first and second multipliers 303 and 307 each receive input data, d1. FIG. 19 shows what factors and data are held by each latch at cycle t1. Latch A holds data, X1. Latch B holds data, X2. First factor hold circuit 304 outputs a1 to first multiplier 303. In response, first multiplier 303 outputs a1×d1. Second factor hold circuit 308 outputs a2 to second multiplier 307. In response, second multiplier 307 outputs a2×d1. Adder 302 performs addition of the output of second multiplier 307 and data held by latch A, thereby outputting X1+a2×d1.

At cycle t2, (a) X2 held by latch B is shifted to latch A, (b) the output of first multiplier 303 selected by selector 321 (i.e., a1×d1) is stored into latch B, and (c) the output of adder 302 (i.e., X1+a2×d1) is stored into latch C. The output of second factor hold circuit 308 is changed from a2 to a3 by a shift operation. As a result, second multiplier 307 outputs a3×d1, and adder 302 outputs X2+a3×d1.

At cycle t3, first and second multipliers 303 and 307 each receive input data, d2. In data hold circuit 305, (a) a1×d1 latched by latch B is shifted to latch A, (b) X1+a2×d1 held by latch C selected by selector 321 is stored into latch B, and (c) the output of adder 302 (i.e., X2+a3×d1) is stored into latch C. The output of second factor hold circuit 308 is changed from a3 to a2 by a shift operation. As a result, (a) first multiplier 303 outputs a1×d2, (b) second multiplier 307 outputs a2×d2, and (c) adder 302 outputs a1×d1+a2×d2.

At cycle t4, in the data hold circuit 305, (a) X1+a2×d1 held by latch B is shifted to latch A, (b) the output of first multiplier 303 (i.e., a1×d2) selected by selector 321 is stored into latch B, and (c) the output of adder 302 (i.e., a1×d1+a2×d2) is stored into latch C. The output of second factor hold circuit 308 is changed from a2 to a3 by a shift operation. As a result, second multiplier 307 outputs a3×d2, and adder 302 outputs X1+a2×d1+a3×d2.

The operations of cycles t5 and t6 are similar to the operations of cycles t3 and t4. In other words, a1×d1+a2×d2, held by latch C at cycle t4, reaches, through latch B (cycle t5), latch A at cycle t6. This data, a1×d1+a2×d2, is added to the product of a3×d3. This causes adder 302 to give an output of a1×d1+a2×d2+a3×d3.

The output of adder 302 at cycle t6, a1×d1+a2×d2+a3×d3, is a result of the filter processing on a series of input data (i.e., d1, d2, and d3), and this result is output from output latch 310 at cycle t7. a1×d2+a2×d3 being stored into latch C at cycle t6 is an intermediate result of the filter processing on a next series of input data (i.e., d2, d3, and d4). a1×d3 being stored into latch B at cycle t6 is an intermediate result as to a next series of input data (i.e., d3, d4, and d5). After cycle t7 onward, output latch 310 sequentially outputs a result of the filter processing at 2-clock cycle intervals.

As described above, in accordance with the horizontal filter of FIG. 19, the product of a1×di found at cycle t(2×i−1) is stored into latch A at cycle t(2×i+1) via latch B, and the product of a2×d(i+1) is added to a1×di held by latch A. The sum thus found (i.e., a1×di+a2×d(i+1)) is stored into latch A at cycle t(2×i+4) via latches C and B, and the product of a3×d(i+2) is added to a1×di+a2×d(i+1) held by latch A, and a1×di+a2×d(i+1)+a3×d(i+2) is output at cycle t(2×i+5). As described above, the 3-tap horizontal filter operation can be accomplished with a structure requiring a less number of multipliers (i.e., two multipliers).

The present modified embodiment can readily be changed to a 2-multiplier filter having a different number of taps. First factor hold circuit 304 may be identical in configuration with second factor hold circuit 308. First and second factor hold circuits 304 and 308 may be formed by shift registers capable of performing bidirectional shift operations.

Modified Example 2

Figure 21:
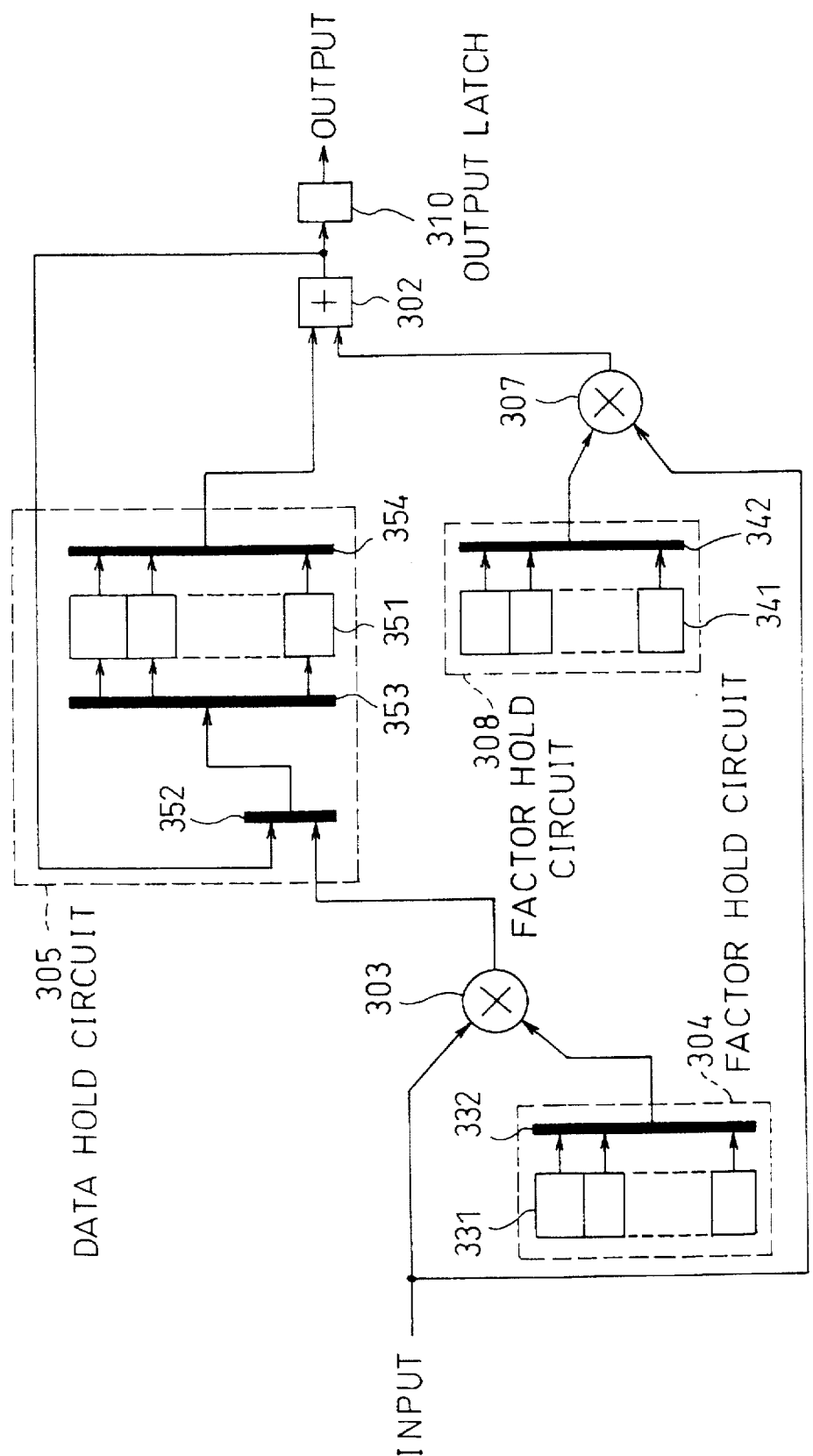
FIG. 21 is a block diagram showing a second modification of the horizontal filter.

FIG. 21 is a block diagram showing the structure of a horizontal filter in accordance with a second modified embodiment of the present invention. Shown in FIG. 21 are first multiplier 303, second multiplier 307, adder 302, and output latch 310. First factor hold circuit 304 is made up of a plurality of latches 331 each of which holds a respective factor and one selector 332. Second factor hold circuit 308 is made up of a plurality of latches 341 each of which holds a respective factor and one selector 342. Data hold circuit 305 is made up of a plurality of latches 351 and first to third selectors 352–354.

Input data for each pixel is fed in parallel to first multiplier 303 and to second multiplier 307. First factor hold circuit 304 outputs a factor held by one of latches 331 that is selected by selector 332. Likewise, second factor hold circuit 308 outputs a factor held by one of latches 341 that is selected by selector 342. First multiplier 303 multiplies input data by the output of first factor hold circuit 304. Second multiplier 307 multiplies input data by the output of second factor hold circuit 308. In data hold circuit 305, first selector 352 performs a selection between the output of first multiplier 303 and the output of adder 302, and the output thus selected by first selector 352 is stored into one selected by second selector 353 from among latches 351. Latches 351 give their respective outputs to selector 354. In response, selector 354 determines which one of the received outputs to be provided. Adder 302 performs an addition operation of the output of data hold circuit 305 and the output of multiplier 307. The output of adder 302 is fed back to data hold circuit 305 and is also provided to the outside via output latch 310.

To accomplish the same 3-tap horizontal filter operation as accomplished by the horizontal filter of FIG. 19, it may be arranged so that first factor hold circuit 304 holds a1 and second factor hold circuit 308 holds a2 as well as a3, wherein selector 342 within second factor hold circuit 308 is switched instead of performing a factor shift operation. Additionally, instead of performing a data shift operation, second and third selectors 353 and 354 within data hold circuit 305 are switched.

In accordance with the present modified embodiment, the 3-tap horizontal filter operation can be accomplished with a filter structure requiring a less number of multipliers (i.e., two multipliers). Use of latches 331 within first factor hold circuit 304 and latches 341 within second factor hold circuit 308 facilitates other filter operations. It is not necessary to make each latch hold the same factor, so that the duplication is avoidable. For the case of factors of a symmetric type (e.g., (1,2,3,4,3,2,1)), it is just enough to provide latches only for a part of it, that is, (1, 2, 3, 4).

Modified Embodiment 3

Figure 22:
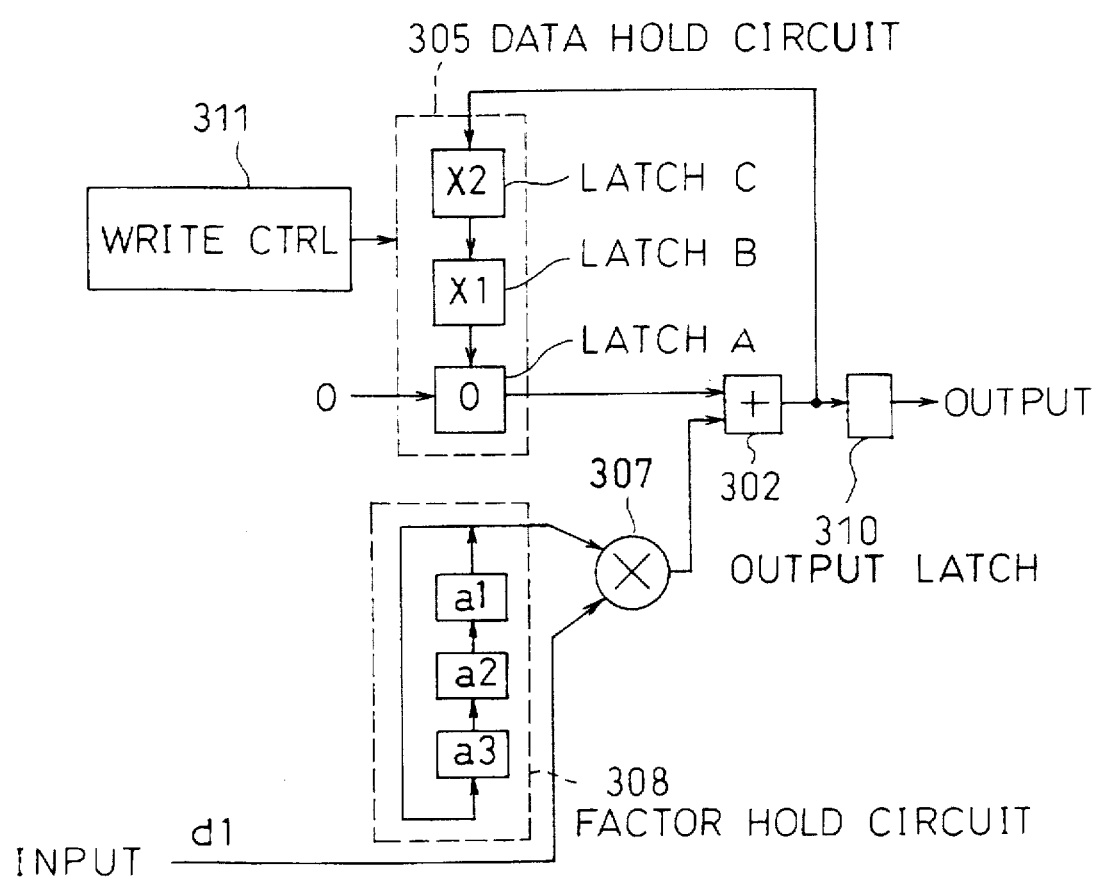
FIG. 22 is a block diagram showing a third modification of the horizontal filter.

FIG. 22 shows the structure of a 3-tap horizontal filter in accordance with a third modified embodiment of the present invention. In contrast with the first modified embodiment that requires two multipliers, a 3-tap horizontal filter of the present modified embodiment needs only one multiplier. 307 is a multiplier. 302 is an adder. 310 is an output latch. 308 is a factor hold circuit made up of three latches and these three latches are so connected together as to form a shift register. 305 is a data hold circuit made up of three latches A–C and these three latches are so connected together as to form a shift register. Under the control of write control circuit 311, the resetting of latch A and the shift operations of latches A–C are performed. Clock signals (not shown) are applied to each component for synchronization.

Input data for each pixel is fed to multiplier 307. This input data is updated at 3-clock cycle intervals. Multiplier 307 performs a multiplication operation of input data by the output of factor hold circuit 308. Write control circuit 311 writes a 0 into latch A of data hold circuit 305 each time the input data is updated. In other words, the data held by latch A is reset to 0 after every input data is updated. Adder 302 performs an addition operation of the output of latch A and the output of multiplier 307. The output of adder 302 is stored into latch C and is also provided, by way of output latch 310, to the outside at intervals of 3-clock cycles.

With the above-described configuration, the same 3-tap horizontal operation as accomplished by the first modified embodiment can be realized. That is, the horizontal filter of FIG. 22, too, performs an operation of $a1 \times di + a2 \times d(i+1) + a3 \times d(i+2)$ where $a1$–$a3$ are factors and $di$ is the i-th input data. Factor hold circuit 308 holds $a1$, $a2$, and $a3$.

Figure 23:
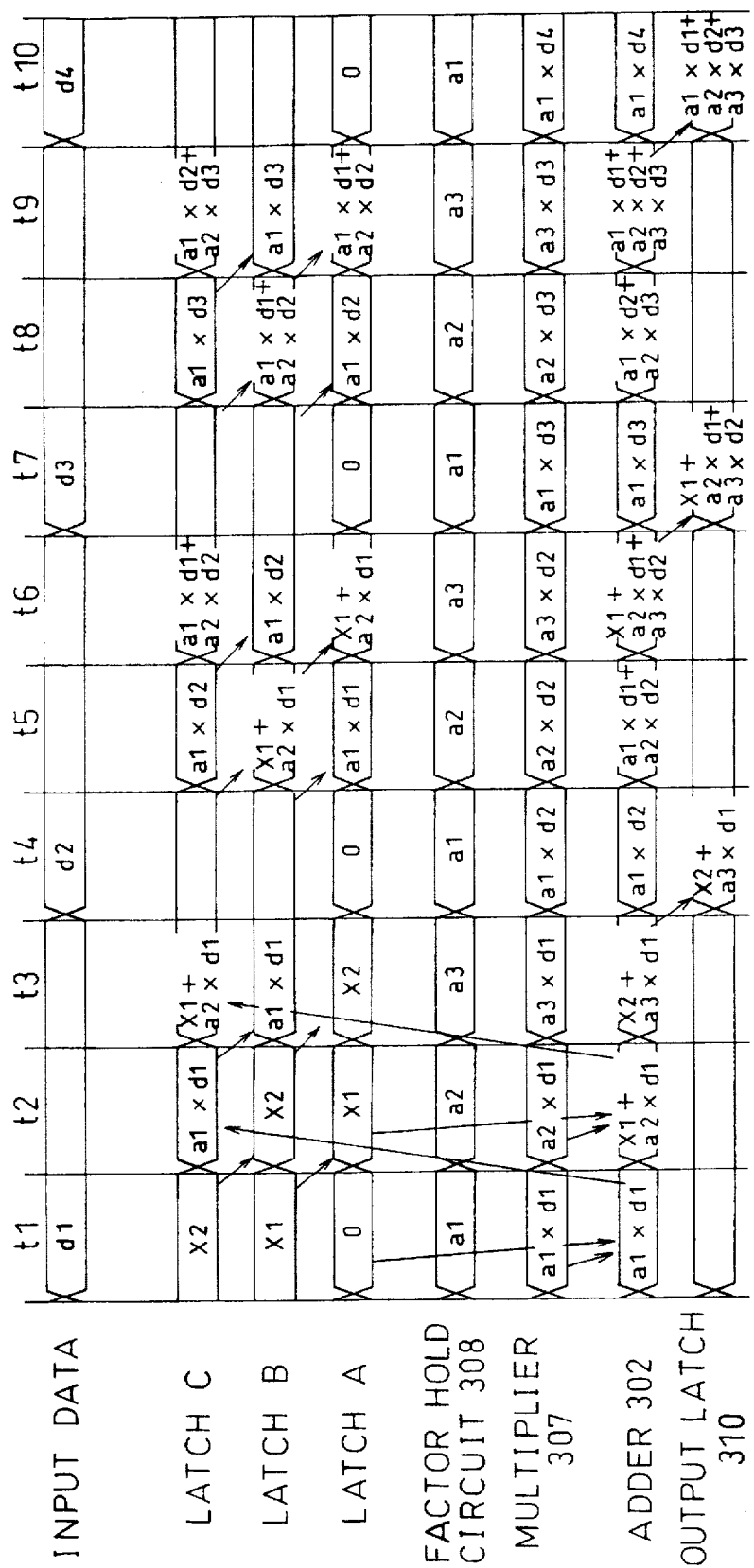
FIG. 23 is a timing diagram showing the operation of the horizontal filter of FIG. 22.

Referring now to FIG. 23, the operation of the horizontal filter shown in FIG. 22 is described below.

At cycle t1, input data, d1, is fed to multiplier 307. Factors and data, held at this point of time by each latch, are shown in FIG. 22. The data held by latch A of data hold circuit 305 is reset by write control circuit 311 to zero. Latch B holds data, X1. Latch C holds data, X2. Factor hold circuit 308 outputs a factor, a1. So, multiplier 307 performs a multiplication operation of a1 times d1, and the product found is provided. Adder 302 performs an addition operation of the output of multiplier 307 and the data held by latch A (i.e., zero), thereby outputting the sum found, a1×d1.

At cycle t2, in data hold circuit 305, (a) X1 held by latch B is shifted to latch A, (b) X2 held by latch C is shifted to latch B, and (c) the output of adder 302 (i.e., a1×d1) is stored into latch C. The output of factor hold circuit 308 is changed from a1 to a2 by a shift operation. As a result, multiplier 307 outputs a2×d1, and adder 302 outputs X1+a2×d1.

At cycle t3, (a) X2 held by latch B is shifted to latch A, (b) a1×d1 held by latch C is shifted to latch B, and (c) the output of adder 302 (i.e., X1+a2×d1) is stored into latch C. The output of factor hold circuit 308 is changed from a2 to a3 by a shift operation. As a result, multiplier 307 outputs a3×d1, and adder 302 outputs X2+a3×d1.

At cycle t4, the next input data, d2, is fed to multiplier 307. This again resets the data held by latch A to zero. No shift operations by data hold circuit 305 are executed, so that latch B continues to hold a1×d1 and latch C continues to hold X1+a2×d1. Meanwhile, the output of factor hold circuit 308 is changed from a3 to a1 by a shift operation. As a result, multiplier 307 outputs a1×d2, and adder 302 performs an addition operation of the output of multiplier 307 and the data held by latch A (i.e., zero), thereby outputting the sum found (i.e., a1×d2).

At cycle t5, in data hold circuit 305, (a) a1×d1 held by latch B is shifted to latch A, (b) X1+a2×d1 held by latch C is shifted to latch B, and (c) the output of adder 302 (i.e., a1×d2) is stored into latch C. The output of factor hold circuit 308 is changed from a1 to a2 by a shift operation. As a result, multiplier 307 outputs a2×d2, and adder 302 outputs a1×d1+a2×d2.

At cycle t6, (a) X1+a2×d1 held by latch B is shifted to latch A, (b) a1×d2 held by latch C is shifted to latch B, and (c) the output of adder 302 (i.e., a1×d1+a2×d2) is stored into latch C. The output of factor hold circuit 308 is changed from a2 to a3 by a shift operation. As a result, multiplier 307 outputs a3×d2, and adder 302 outputs X1+a2×d1+a3×d2.

The operations of cycles t7, t8, and t9 are the same as those of cycles t4, t5, and t6. a1×d1+a2×d2 held by latch C at cycle t6 reaches latch A at cycle t9 by way of latch B (cycle t8). This data, a1×d1+a2×d2, is added to the product of a3×d3, whereby adder 302 outputs a1×d1+a2×d2+a3×d3.

The output of adder 302 at cycle t9 (i.e., a1×d1+a2×d2+a3×d3) is a result of the filter processing on input data (i.e., d1, d2, and d3 which are input in series), and this result is output from output latch 310 at cycle t10. Data, a1×d2+a2×d3, being stored into latch C at cycle t9, is an intermediate result of the filter processing on input data (i.e., d2, d3, and d4 which are input in series). Data, a1×d3, being stored into latch B at cycle t9, is an intermediate result of the filter processing on input data (i.e., d3, d4, and d5 which are input in series). After cycle t10 onward, output latch 310 sequentially outputs the result of the filter processing at intervals of 3-clock cycles.

As described above, in accordance with the horizontal filter of FIG. 22, the product of a1×di, where di is an item of input data fed at cycle t(3×i−2)), is stored into latch A at cycle t(3×i+2) via latch C and latch B, and the product of a2×d(i+1) is added to a1×di held by latch A. The sum thus found (i.e., a1×di+a2×d(i+1)) is stored into latch A at cycle t(3×i+6) via latches C and B, and the product of a3×d(i+2) is added to a1×di+a2×d(i+1) held by latch A, and a1×di+ a2×d(i+1)+a3×d(i+2) is output at cycle t(3×i+7). As described above, the 3-tap horizontal filter operation can be accomplished with a structure requiring a less number of multipliers (i.e., one multiplier).

The present modified embodiment can readily be changed to a 1-multiplier filter having a different number of taps. Factor hold circuit 308 may be formed by a shift register capable of performing bidirectional operations.

Modified Example 4

Figure 24:
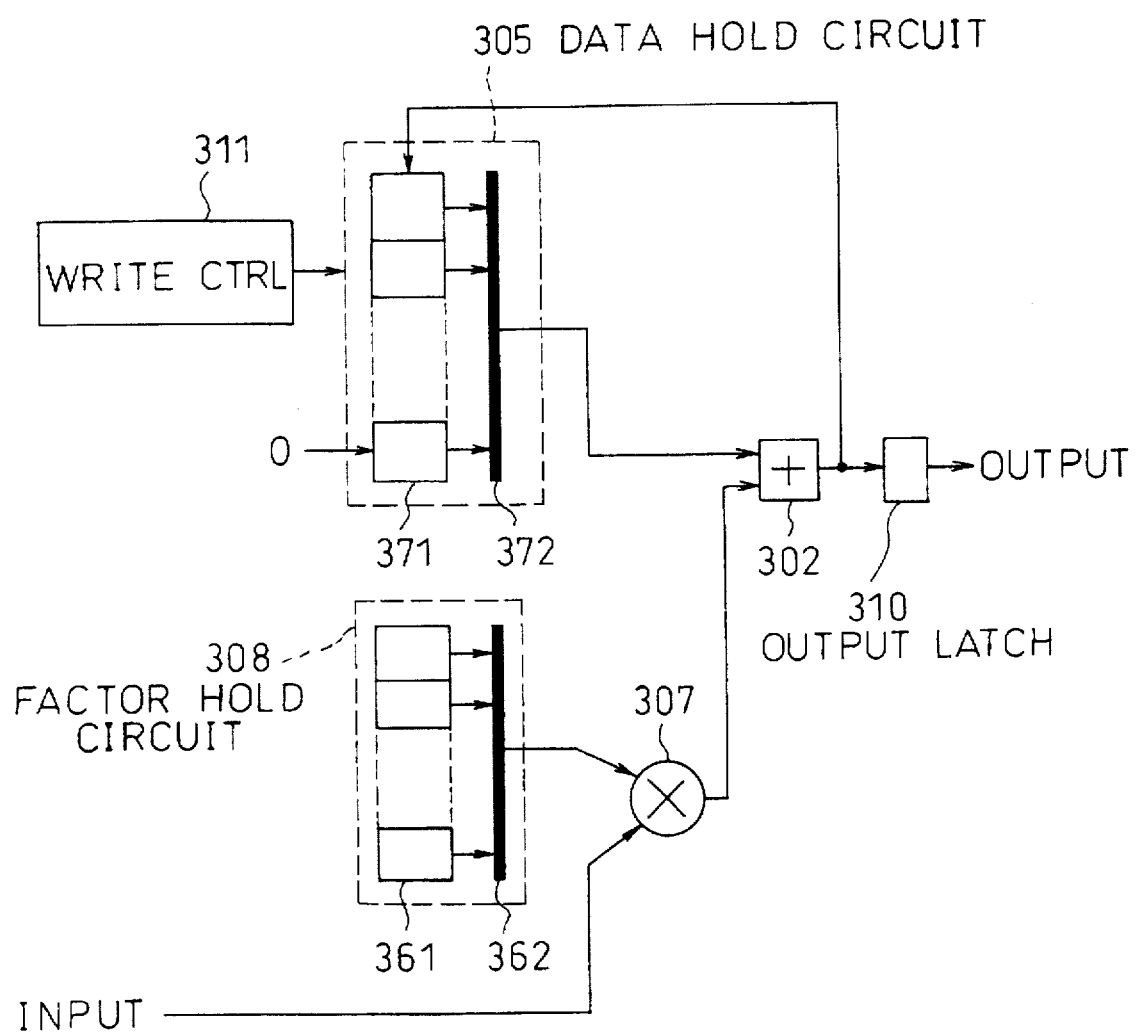
FIG. 24 is a block diagram showing a fourth modification of the horizontal filter.
Figure 25:
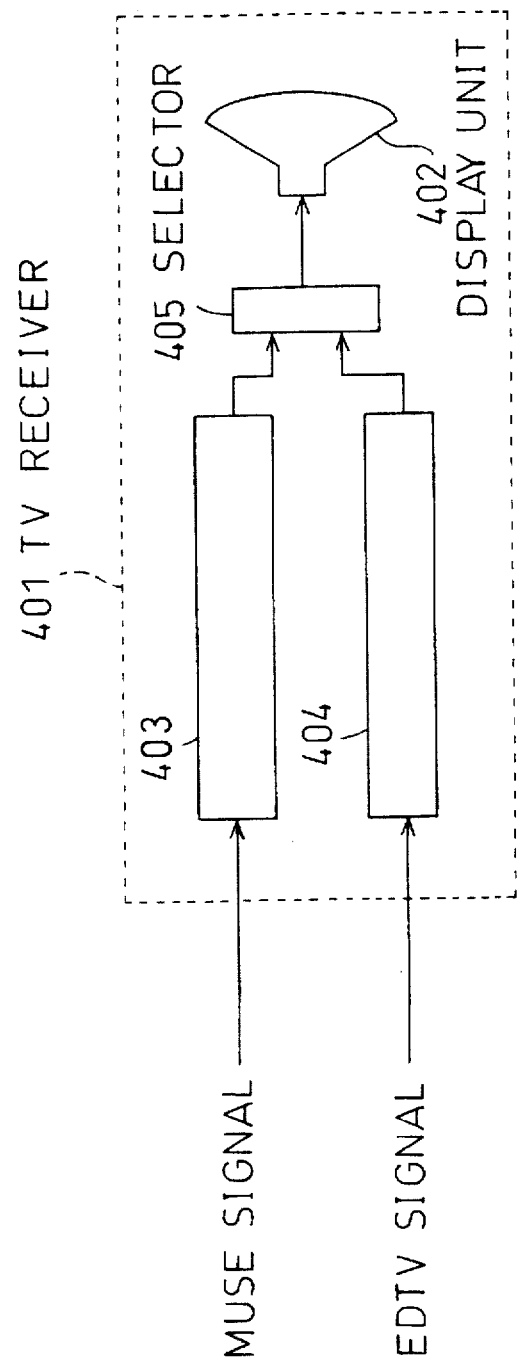
FIG. 25 is a block diagram showing the structure of a conventional TV receiver.

FIG. 24 is a block diagram showing the structure of a horizontal filter in accordance with a fourth modified embodiment of the present invention. 307 is a multiplier. 302 is an adder. 310 is an output latch. 308 is a factor hold circuit made up of a plurality of latches 361 and one selector 362. 305 is a data hold circuit made up of a plurality of latches 371 and one selector 372. 311 is a write control circuit to control the write operation to each latch 371 of data hold circuit 305.

Multiplier 307 is fed input data for each pixel. Factor hold circuit 308 outputs a factor held by one of latches 361 that is selected by selector 362. Multiplier 307 multiplies input data by the output of factor hold circuit 308. In data hold circuit 305, either the output of adder 302 or data zero to reset the held data is selected by write control circuit 311, and the selected one is stored into one selected by write control circuit 311 from among latches 371. Latches 371 give their respective outputs to selector 372. In response, selector 372 determines which one of the received outputs to be provided. Adder 302 performs an addition operation of the output of data hold circuit 305 and the output of multiplier 307. The output of adder 302 is fed back to data hold circuit 305 and is also provided to the outside by way of output latch 310.

In order to accomplish the same 3-tap horizontal filter operation as accomplished by the horizontal filter of FIG. 22, it is arranged so that factor hold circuit 308 holds a1, a2, and a3, wherein selector 362 of factor hold circuit 308 is switched instead of performing a factor shift operation. Additionally, instead of performing a data shift operation, selector 372 of data hold circuit 305 is switched.

In accordance with the present modified embodiment, the same 3-tap horizontal filter operation as accomplished by the horizontal filter of FIG. 22 can be accomplished with reducing the number of multipliers to one. Making use of latches 361 within factor hold circuit 308 facilitates other filter operations. It is not necessary to make each latch hold the same factor, so that the duplication is avoidable.

The way of setting factors to factor hold circuits 304 and 308 of the above-described modified embodiments is the same as the one described with reference to FIG. 13. In other words, a select circuit of switch circuit 14 reads information out of an arithmetic control register of register set 13a or register set 13b, and the read information is set to factor hold circuits 304 and 308.

In contrast with the conventional 3-tap horizontal filter structure requiring three multipliers, the above-described modified embodiments of the present invention can reduce the number of multipliers required down to two or one. Whereas the first and second modified embodiments each provide high-speed performance, the third and fourth ones each require a less amount of hardware. If an input select circuit is added to the FIG. 19 (21, 22, and 24) structure and the input select circuit is made to sequentially select 3-line data, this makes it possible for such a structure to work as a 3-tap vertical filter.

What is claimed is:

1. A signal processor comprising:
   (a) K arithmetic units where the number K is an integer greater than or equal to 2;
   said each arithmetic unit having at least one input signal line and having at least one output signal line;
   wherein said each arithmetic unit performs an arithmetic operation on data on said input signal line thereby providing an arithmetic operation result found onto said output signal line;
   (b) switch means;
   said switch means having at least (K+1) input data lines and having at least (K+1) output data lines;
   K of said (K+1) input data lines of said switch means being connected with said K output signal lines of said K arithmetic units;
   wherein one of the (K+1) input data lines of the switch means receives external data and the remaining K input data lines receive outputs of the K arithmetic units;
   K of said (K+1) output data lines of said switch means being connected with said K input signal lines of said K arithmetic units;
   wherein output data to the outside is obtained from one of the (K+1) output data lines of said switch means and data on the remaining K output data lines are used as data to the K arithmetic units;
   wherein said switch means establishes detachable and interchangeable connections of said (K+1) input data lines with said (K+1) output data lines;
   (c) a plurality of register sets;
   said each register set holding arithmetic control information designating contents of arithmetic operation processes to be performed by said K arithmetic units;
   said each register set holding connection control information designating connection ways of said (K+1) input data lines and said (K+1) output data lines of said switch means;
   (d) means to allow any of said plural register sets to be selected to switch processes of said signal processor; and
   (e) means to update information held by said plural register sets to switch processes by said signal processor,
   wherein signal process switching operations by said register set selection are performed each time one field of input image data is processed.

2. A signal processor comprising:
   (a) K arithmetic units where the number K is an integer greater than or equal to 2;
   said each arithmetic unit having at least one input signal line and having at least one output signal line;
   wherein said each arithmetic unit performs an arithmetic operation on data on said input signal line thereby providing an arithmetic operation result found onto said output signal line;
   (b) switch means;

said switch means having at least (K+1) input data lines and having at least (K+1) output data lines;

K of said (K+1) input data lines of said switch means being connected with said K output signal lines of said K arithmetic units;

wherein one of the (K+1) input data lines of the switch means receives external data and the remaining K input data lines receive outputs of the K arithmetic units;

K of said (K+1) output data lines of said switch means being connected with said K input signal lines of said K arithmetic units;

wherein output data to the outside is obtained from one of the (K+1) output data lines of said switch means and data on the remaining K output data lines are used as data to the K arithmetic units;

wherein said switch means establishes detachable and interchangeable connections of said (K+1) input data lines with said (K+1) output data lines;

(c) a plurality of register sets;

said each register set holding arithmetic control information designating contents of arithmetic operation processes to be performed by said K arithmetic units;

said each register set holding connection control information designating connection ways of said (K+1) input data lines and said (K+1) output data lines of said switch means;

(d) means to allow any of said plural register sets to be selected to switch processes of said signal processor; and (e) means to update information held by said plural register sets to switch processes by said signal processor.

wherein signal process switching operations by said register set selection are performed each time one line of input image data is processed.

3. A signal processor comprising:

(a) K arithmetic units where the number K is an integer greater than or equal to 2;

said each arithmetic unit having at least one input signal line and having at least one output signal line;

wherein said each arithmetic unit performs an arithmetic operation on data on said input signal line thereby providing an arithmetic operation result found onto said output signal line;

(b) switch means;

said switch means having at least (K+1) input data lines and having at least (K+1) output data lines;

K of said (K+1) input data lines of said switch means being connected with said K output signal lines of said K arithmetic units;

wherein one of the (K+1) input data lines of the switch means receives external data and the remaining K input data lines receive outputs of the K arithmetic units;

K of said (K+1) output data lines of said switch means being connected with said K input signal lines of said K arithmetic units;

wherein output data to the outside is obtained from one of the (K+1) output data lines of said switch means and data on the remaining K output data lines are used as data to the K arithmetic units;

wherein said switch means establishes detachable and interchangeable connections of said (K+1) input data lines with said (K+1) output data lines; and wherein said switch means comprises:

(i) a first bus switch;

said first bus switch having at least (K+1) first input data lines and having at least K first output data lines;

said K first output data lines being connected with said K input signal lines of said K arithmetic units;

wherein said first bus switch establishes detachable and interchangeable connections of said (K+1) first input data lines with said K first output data lines; and (ii) a second bus switch;

said second bus switch having at least K second input data lines and having at least (K+1) second output data lines;

said K second input data lines being connected with said K output signal lines of said K arithmetic units;

K of said (K+1) second output data lines being connected with K of said (K+1) first input data lines of said first bus switch;

wherein said second bus switch establishes detachable and interchangeable connections of said K second input data lines with said (K+1) second output data lines, and (c) information hold means;

said information hold means holding arithmetic control information designating contents of arithmetic operation processes to be performed by said K arithmetic units;

said information hold means holding connection control information designating connection ways of said (K+1) input data lines with said (K+1) output data lines of said switch means.

* * * * *